US008928696B1

(12) United States Patent
Yang

(10) Patent No.: US 8,928,696 B1
(45) Date of Patent: *Jan. 6, 2015

(54) METHODS AND APPARATUS FOR OPERATING HYSTERESIS ON A HAND HELD DEVICE

(75) Inventor: Xiao "Charles" Yang, Cupertino, CA (US)

(73) Assignee: mCube Inc., San Jose, CA (US)

(*) Notice: Subject to any disclaimer, the term of this patent is extended or adjusted under 35 U.S.C. 154(b) by 351 days.

This patent is subject to a terminal disclaimer.

(21) Appl. No.: 13/069,355

(22) Filed: Mar. 22, 2011

Related U.S. Application Data

(60) Provisional application No. 61/356,467, filed on Jun. 18, 2010, provisional application No. 61/367,032, filed on Jul. 23, 2010.

(51) Int. Cl.
G09G 5/00 (2006.01)

(52) U.S. Cl.
USPC .......................................................... 345/659

(58) Field of Classification Search
None
See application file for complete search history.

(56) References Cited

U.S. PATENT DOCUMENTS

| | | |
|---|---|---|
| 3,614,677 A | 10/1971 | Wilfinger |
| 4,954,698 A | 9/1990 | Yasunaga et al. |
| 5,140,745 A | 8/1992 | McKenzie |
| 5,157,841 A | 10/1992 | Dinsmore |
| 5,173,597 A | 12/1992 | Anglin |
| 5,493,769 A | 2/1996 | Sakai et al. |
| 5,610,414 A | 3/1997 | Yoneda et al. |
| 5,668,033 A | 9/1997 | Ohara |
| 5,729,074 A | 3/1998 | Shiomi et al. |
| 6,046,409 A | 4/2000 | Ishii et al. |
| 6,076,731 A | 6/2000 | Terrell |
| 6,115,261 A | 9/2000 | Platt et al. |
| 6,188,322 B1 | 2/2001 | Yao et al. |
| 6,263,736 B1 | 7/2001 | Thundat et al. |
| 6,278,178 B1 | 8/2001 | Kwon et al. |
| 6,480,699 B1 | 11/2002 | Lovoi |
| 6,483,172 B1 | 11/2002 | Cote |
| 6,485,273 B1 | 11/2002 | Goodwin-Johansson |
| 6,534,726 B1 | 3/2003 | Okada et al. |
| 6,656,604 B2 | 12/2003 | Hasewaga |
| 6,753,664 B2 | 6/2004 | Neufeld et al. |

(Continued)

OTHER PUBLICATIONS

International Search Report and Written Opinion of PCT Application No. PCT/US10/054567, mailed on Jan. 6, 2011, 7 pages total.

(Continued)

Primary Examiner — Aaron M Richer
Assistant Examiner — Anh-Tuan V Nguyen
(74) Attorney, Agent, or Firm — Kilpatrick Townsend and Stockton LLP

(57) ABSTRACT

A handheld device and methods of operation. The device includes a housing and a display. A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to the display, wherein the processor is programmed to receive the change in spatial orientation of the handheld device, and wherein the processor is programmed output an indication of the change in spatial orientation on the display. A computer implemented method for a handheld computer system for determining spatial orientation is also disclosed.

20 Claims, 31 Drawing Sheets

(56) References Cited

U.S. PATENT DOCUMENTS

| | | | |
|---|---|---|---|
| 6,855,572 B2 | 2/2005 | Jeung et al. |
| 6,912,336 B2 | 6/2005 | Ishii |
| 6,933,165 B2 | 8/2005 | Musolf et al. |
| 6,979,872 B2 | 12/2005 | Borwick et al. |
| 7,019,434 B2 | 3/2006 | Helmbrecht |
| 7,095,226 B2 | 8/2006 | Wan et al. |
| 7,145,555 B2 | 12/2006 | Taylor et al. |
| 7,183,630 B1 | 2/2007 | Fogelson et al. |
| 7,195,945 B1 | 3/2007 | Edelstein et al. |
| 7,239,000 B2 | 7/2007 | Witcraft |
| 7,253,079 B2 | 8/2007 | Hanson et al. |
| 7,258,009 B2 | 8/2007 | Imai |
| 7,358,724 B2 | 4/2008 | Taylor et al. |
| 7,370,530 B2 | 5/2008 | DCamp et al. |
| 7,391,091 B2 | 6/2008 | Tondra |
| 7,402,449 B2 | 7/2008 | Fukuda et al. |
| 7,430,674 B2 | 9/2008 | Van Mueller et al. |
| 7,454,705 B2 | 11/2008 | Cadez et al. |
| 7,456,042 B2 | 11/2008 | Stark |
| 7,493,496 B2 | 2/2009 | Smith et al. |
| 7,498,715 B2 | 3/2009 | Yang |
| 7,511,379 B1 | 3/2009 | Flint |
| 7,514,760 B1 | 4/2009 | Quevy |
| 7,521,783 B2 | 4/2009 | Tsai et al. |
| 7,536,909 B2 | 5/2009 | Zhao et al. |
| 7,599,277 B1 * | 10/2009 | Kato et al. | 369/112.27 |
| 7,612,443 B1 | 11/2009 | Bernstein et al. |
| 7,671,478 B2 | 3/2010 | Wathanawasam et al. |
| 7,676,340 B2 | 3/2010 | Yasui |
| 7,690,255 B2 | 4/2010 | Gogoi et al. |
| 7,692,521 B1 * | 4/2010 | Cohn | 335/78 |
| 7,708,189 B1 | 5/2010 | Cipriano |
| 7,713,785 B1 | 5/2010 | Flint |
| 7,779,689 B2 | 8/2010 | Li et al. |
| 7,814,791 B2 | 10/2010 | Andersson et al. |
| 7,814,792 B2 | 10/2010 | Tateyama et al. |
| 7,814,793 B2 | 10/2010 | Sato |
| 7,861,422 B2 | 1/2011 | MacDonald |
| 7,891,103 B2 | 2/2011 | Mayor |
| 8,011,577 B2 | 9/2011 | Mullen et al. |
| 8,016,191 B2 | 9/2011 | Bonalle et al. |
| 8,037,758 B2 | 10/2011 | Sato |
| 8,056,412 B2 | 11/2011 | Rutkiewicz et al. |
| 8,061,049 B2 | 11/2011 | Mayor |
| 8,070,055 B2 | 12/2011 | Block et al. |
| 8,087,296 B2 | 1/2012 | Ueda et al. |
| 8,140,358 B1 | 3/2012 | Ling et al. |
| 8,148,808 B2 | 4/2012 | Braden et al. |
| 8,165,323 B2 | 4/2012 | Zhou |
| 8,181,874 B1 | 5/2012 | Wan et al. |
| 8,227,285 B1 | 7/2012 | Yang |
| 8,236,577 B1 | 8/2012 | Hsu |
| 8,245,923 B1 | 8/2012 | Merrill et al. |
| 8,250,921 B1 | 8/2012 | Nasiri et al. |
| 8,259,311 B2 | 9/2012 | Petschko |
| 8,324,047 B1 | 12/2012 | Yang |
| 8,342,021 B2 | 1/2013 | Oshio |
| 8,367,522 B1 | 2/2013 | Yang |
| 8,395,252 B1 | 3/2013 | Yang |
| 8,395,381 B2 | 3/2013 | Lo |
| 8,402,666 B1 | 3/2013 | Hsu et al. |
| 8,407,905 B1 | 4/2013 | Hsu et al. |
| 8,421,082 B1 | 4/2013 | Yang |
| 8,476,084 B1 | 7/2013 | Yang et al. |
| 8,476,129 B1 | 7/2013 | Jensen et al. |
| 8,477,473 B1 | 7/2013 | Koury et al. |
| 8,486,723 B1 | 7/2013 | Wan et al. |
| 2001/0053565 A1 | 12/2001 | Khoury |
| 2002/0072163 A1 | 6/2002 | Wong et al. |
| 2002/0134837 A1 | 9/2002 | Kishon |
| 2003/0058069 A1 | 3/2003 | Schwartz et al. |
| 2003/0095115 A1 | 5/2003 | Brian et al. |
| 2003/0133489 A1 * | 7/2003 | Hirota et al. | 374/121 |
| 2003/0184189 A1 | 10/2003 | Sinclair |
| 2004/0002808 A1 * | 1/2004 | Hashimoto et al. | 701/107 |
| 2004/0016995 A1 | 1/2004 | Kuo et al. |
| 2004/0017644 A1 | 1/2004 | Goodwin-Johansson |
| 2004/0056742 A1 | 3/2004 | Dabbaj |
| 2004/0063325 A1 | 4/2004 | Urano et al. |
| 2004/0104268 A1 | 6/2004 | Bailey |
| 2004/0113246 A1 | 6/2004 | Boon |
| 2004/0119836 A1 | 6/2004 | Kitaguchi et al. |
| 2004/0140962 A1 | 7/2004 | Wang et al. |
| 2004/0177045 A1 | 9/2004 | Brown |
| 2004/0207035 A1 | 10/2004 | Witcraft et al. |
| 2004/0227201 A1 | 11/2004 | Borwick et al. |
| 2005/0074147 A1 | 4/2005 | Smith et al. |
| 2005/0174338 A1 | 8/2005 | Ing |
| 2005/0199791 A1 * | 9/2005 | Sengoku et al. | 250/231.13 |
| 2005/0247787 A1 | 11/2005 | Von Mueller et al. |
| 2005/0252293 A1 | 11/2005 | Won et al. |
| 2006/0049826 A1 | 3/2006 | Daneman et al. |
| 2006/0081954 A1 | 4/2006 | Tondra et al. |
| 2006/0141786 A1 | 6/2006 | Boezen et al. |
| 2006/0168832 A1 | 8/2006 | Yasui et al. |
| 2006/0192465 A1 | 8/2006 | Kornbluh et al. |
| 2006/0208326 A1 | 9/2006 | Nasiri et al. |
| 2006/0211044 A1 | 9/2006 | Green |
| 2006/0238621 A1 | 10/2006 | Okubo et al. |
| 2006/0243049 A1 | 11/2006 | Ohta et al. |
| 2006/0250193 A1 * | 11/2006 | Schmidt | 331/158 |
| 2006/0274399 A1 | 12/2006 | Yang |
| 2007/0023851 A1 * | 2/2007 | Hartzell et al. | 257/414 |
| 2007/0046239 A1 * | 3/2007 | Hashizume | 318/575 |
| 2007/0132733 A1 | 6/2007 | Ram |
| 2007/0152976 A1 | 7/2007 | Townsend et al. |
| 2007/0181962 A1 | 8/2007 | Partridge et al. |
| 2007/0200564 A1 | 8/2007 | Motz et al. |
| 2007/0281379 A1 | 12/2007 | Stark et al. |
| 2008/0014682 A1 | 1/2008 | Yang et al. |
| 2008/0066547 A1 | 3/2008 | Tanaka et al. |
| 2008/0110259 A1 | 5/2008 | Takeno |
| 2008/0119000 A1 | 5/2008 | Yeh et al. |
| 2008/0123242 A1 | 5/2008 | Zhou |
| 2008/0210007 A1 | 9/2008 | Yamaji et al. |
| 2008/0211043 A1 | 9/2008 | Chen |
| 2008/0211113 A1 | 9/2008 | Chua et al. |
| 2008/0211450 A1 * | 9/2008 | Yamada et al. | 318/801 |
| 2008/0277747 A1 | 11/2008 | Ahmad |
| 2008/0283991 A1 | 11/2008 | Reinert |
| 2009/0007661 A1 | 1/2009 | Nasiri et al. |
| 2009/0015251 A1 * | 1/2009 | Azumi et al. | 324/247 |
| 2009/0049911 A1 | 2/2009 | Fukuda et al. |
| 2009/0108440 A1 | 4/2009 | Meyer et al. |
| 2009/0115412 A1 | 5/2009 | Fuse |
| 2009/0153500 A1 | 6/2009 | Cho et al. |
| 2009/0262074 A1 * | 10/2009 | Nasiri et al. | 345/158 |
| 2009/0267930 A1 | 10/2009 | Schroderus |
| 2009/0298253 A1 * | 12/2009 | Rossel et al. | 438/382 |
| 2009/0307557 A1 | 12/2009 | Rao et al. |
| 2009/0321510 A1 | 12/2009 | Day et al. |
| 2010/0044121 A1 | 2/2010 | Simon et al. |
| 2010/0045282 A1 | 2/2010 | Shibasaki et al. |
| 2010/0071467 A1 | 3/2010 | Nasiri et al. |
| 2010/0075481 A1 | 3/2010 | Yang |
| 2010/0083756 A1 | 4/2010 | Merz et al. |
| 2010/0095769 A1 | 4/2010 | Matsumoto et al. |
| 2010/0109102 A1 | 5/2010 | Chen et al. |
| 2010/0171570 A1 | 7/2010 | Chandrahalim |
| 2010/0208118 A1 | 8/2010 | Ueyama |
| 2010/0236327 A1 | 9/2010 | Mao |
| 2010/0248662 A1 | 9/2010 | Sheynblat et al. |
| 2010/0260388 A1 | 10/2010 | Garrett et al. |
| 2010/0302199 A1 | 12/2010 | Taylor et al. |
| 2010/0306117 A1 | 12/2010 | Terayoko |
| 2010/0307016 A1 | 12/2010 | Mayor et al. |
| 2010/0312519 A1 | 12/2010 | Huang et al. |
| 2011/0131825 A1 | 6/2011 | Mayor et al. |
| 2011/0146401 A1 | 6/2011 | Inaguma et al. |
| 2011/0154905 A1 | 6/2011 | Hsu |
| 2011/0172918 A1 * | 7/2011 | Tome | 701/220 |
| 2011/0183456 A1 | 7/2011 | Hsieh et al. |
| 2011/0198395 A1 | 8/2011 | Chen |
| 2011/0265574 A1 | 11/2011 | Yang |

(56) References Cited

U.S. PATENT DOCUMENTS

| | | |
|---|---|---|
| 2011/0266340 A9 | 11/2011 | Block et al. |
| 2011/0312349 A1 | 12/2011 | Forutanpour et al. |
| 2012/0007597 A1 | 1/2012 | Seeger et al. |
| 2012/0007598 A1 | 1/2012 | Lo et al. |
| 2012/0215475 A1 | 8/2012 | Rutledge et al. |

OTHER PUBLICATIONS

Office Action for U.S. Appl. No. 12/945,087, mailed on Mar. 19, 2012, 6 pages.

U.S. Appl. No. 12/913,440, Final Office Action mailed Oct. 10, 2013, 10 pages.

U.S. Appl. No. 12/944,712 Final Office Action mailed Aug. 21, 2013, 15 pages.

U.S. Appl. No. 12/983,309 Notice of Allowance mailed Aug. 13, 2013, 11 pages.

U.S. Appl. No. 13/924,457 Notice of Allowance mailed Sep. 18, 2013, 11 pages.

U.S. Appl. No. 13/035,969 Non-Final Office Action mailed Oct. 25, 2013, 11 pages.

U.S. Appl. No. 12/787,368 Non-Final Office Action mailed Sep. 19, 2013, 19 pages.

U.S. Appl. No. 13/922,983 Notice of Allowance mailed Oct. 7, 2013, 10 pages.

U.S. Appl. No. 12/787,200 Notice of Allowance mailed Sep. 26, 2013, 11 pages.

U.S. Appl. No. 13/177,053 Non-Final Office Action mailed Sep. 18, 2013, 12 pages.

U.S. Appl. No. 13/164,311 Notice of Allowance mailed Sep. 17, 2013, 8 pages.

U.S. Appl. No. 13/163,672 Non-Final Office Action mailed Sep. 5, 2013, 7 pages.

U.S. Appl. No. 12/940,025 Notice of Allowance mailed Oct. 17, 2013, 10 pages.

\* cited by examiner

WLP 1st layer
  Endpoint and stop on W or (

Bondpad open (subsequent wafer bumping for BGA optional)

METHODS AND APPARATUS FOR OPERATING HYSTERESIS ON A HAND HELD DEVICE

CROSS-REFERENCES TO RELATED APPLICATIONS

The present application claims priority to U.S. provisional patent application No. 61/356,467, filed Jun. 18, 2010 and U.S. provisional patent application No. 61/367,032, filed Jul. 23, 2010, both of which are commonly owned and incorporated by reference herein for all purposes. Further, the present application is also related to and incorporates by reference, for all purposes, the following patent applications: U.S. patent application Ser. No. 13/008,865 filed Jan. 18, 2011 now U.S. Pat. No. 8,584,521, U.S. patent application Ser. No. 12/787,200, filed May 25, 2010, now U.S. Pat. No. 8,643,612, U.S. patent application Ser. No. 12/787,368, filed May 25, 2010, now U.S. Pat. No. 8,797,279, U.S. patent application Ser. No. 12/945,087, filed Nov. 12, 2010, now U.S. Pat. No. 8,395,252, and U.S. patent application Ser. No. 12/913,440, filed Oct. 27, 2010, now U.S. Pat. No. 8,823,007.

BACKGROUND OF THE INVENTION

Embodiments of the present invention relate to handheld devices. More specifically, the present invention relates to handheld devices capable of sensing the change of spatial orientation and methods of use thereof.

The use of a variety of handheld devices are now quite common place for consumers: from the Palm Pilot, to the Google Nexus One, to the Apple iPad, and the like. Many of these devices implement the ability to determine the orientation in which a user is holding the device.

Spatial orientation detection has typically been enabled for many handheld devices through the incorporation and use of integrated inertial sensors. These inertial sensors can detect the direction and magnitude of change in position when a user rotates, flips, or tilts the handheld device.

Drawbacks to handheld devices incorporating inertial sensors, determined by the inventor, include that if a user inadvertently rotates or tilts the device, the device registers the movement as a change in orientation and changes the display on the device accordingly. As such algorithms implemented in such devices typically only support non-variable thresholds at specified angles.

From the above, it is desired to have a device with user input capability without the drawbacks described above.

BRIEF SUMMARY OF THE INVENTION

Embodiments of the present invention relate to handheld devices. More specifically, the present invention relates to handheld devices capable of sensing change in spatial orientation and methods of use thereof.

Various embodiments of the present invention disclose a computer system such as a cell phone, internet access device, media player, or the like having a display and one or more physical sensors. In operation, when a user tilts or rotates the device, the function associated with the orientation change is determined. The function may be running of an application program, selection of a function within an application program, and the like. In various embodiments, a type and/or magnitude of movement is determined by the one or more physical sensors also in response to the user spatially manipulating the device. Based upon the type and/or magnitude of movement or combinations of movements, an input parameter or value may be determined for use by the selected function. Next, the function is initiated and given the input parameter or value.

Other embodiments of the present invention disclose a computer system such as a tablet computer, a smart phone, cell phone, or the like also having a display (e.g. touch screen) and one or more physical sensors. In operation, when a user tilts or rotates the device, the function associated with the orientation change is determined. The function may be running of an application program, selection of a function within an application program, and the like. In various embodiments, a type and/or magnitude of movement is determined by the one or more physical sensors also in response to the user spatially manipulating the device. The type and/or magnitude of movement is then compared to one or more thresholds for type and/or magnitude of movement. In various embodiments, if the threshold is not exceeded, the function is inhibited, and when the threshold is exceeded (e.g. enough physical impulse), the function is performed.

Other embodiments of the present invention disclose a computer system such as a tablet computer, a smart phone, cell phone, or the like also having a touch screen display and one or more physical sensors. In operation, when a user physically perturbs the computer system, the perturbation will cause the computer system to perform a user-desired action. The perturbation may be a change in physical position or angular orientation of the computer system, a change in air pressure, a change in sensed magnetic field, or the like. Merely as examples, a user tapping upon a case of the computer system (device) (or a surface upon which the computer system is laying upon or may cause the computer system to take a picture; start or stop a timer; answer or disconnect a telephone call; invoke an application (e.g. knock-knocking on a computer system to invoke a VOIP application, a chat application, an IM, or the like); or the like.

According to one aspect of the invention, a handheld device is described. One apparatus includes a housing and a display. A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to the display, wherein the processor is programmed to receive the change in spatial orientation of the handheld device, and wherein the processor is programmed output an indication of the change in spatial orientation on the display.

According to another aspect of the invention, a computer implemented method for a handheld computer system for determining spatial orientation is disclosed. One technique includes sensing in a MEMS inertial sensor disposed within the handheld computer system, a change in spatial orientation in response to a user spatially reorienting the handheld device. A process may include determining in a processor, the spatial orientation of the handheld device, and displaying on a display, an indication of the spatial orientation of the handheld device.

Various additional objects, features and advantages of the present invention can be more fully appreciated with reference to the detailed description and accompanying drawings that follow.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Embodiments of the present invention relate to handheld devices. More specifically, the present invention relates to handheld devices capable of sensing change in spatial orientation and methods of use thereof.

Various embodiments of the present invention disclose a computer system such as a cell phone, internet access device, media player, or the like having a display and one or more physical sensors. In operation, when a user tilts or rotates the device, the function associated with the orientation change is determined. The function may be running of an application program, selection of a function within an application program, and the like. In various embodiments, a type and/or magnitude of movement is determined by the one or more physical sensors also in response to the user spatially manipulating the device. Based upon the type and/or magnitude of movement or combinations of movements, an input parameter or value may be determined for use by the selected function. Next, the function is initiated and given the input parameter or value.

Other embodiments of the present invention disclose a computer system such as a tablet computer, a smart phone, cell phone, or the like also having a display (e.g. touch screen) and one or more physical sensors. In operation, when a user tilts or rotates the device, the function associated with the orientation change is determined. The function may be running of an application program, selection of a function within an application program, and the like. In various embodiments, a type and/or magnitude of movement is determined by the one or more physical sensors also in response to the user spatially manipulating the device. The type and/or magnitude of movement is then compared to one or more thresholds for type and/or magnitude of movement. In various embodiments, if the threshold is not exceeded, the function is inhibited, and when the threshold is exceeded (e.g. enough physical impulse), the function is performed.

Other embodiments of the present invention disclose a computer system such as a tablet computer, a smart phone, cell phone, or the like also having a touch screen display and one or more physical sensors. In operation, when a user physically perturbs the computer system, the perturbation will cause the computer system to perform a user-desired action. The perturbation may be a change in physical position or angular orientation of the computer system, a change in air pressure, a change in sensed magnetic field, or the like. Merely as examples, a user tapping upon a case of the computer system (device) (or a surface upon which the computer system is laying upon or may cause the computer system to take a picture; start or stop a timer; answer or disconnect a telephone call; invoke an application (e.g. knock-knocking on a computer system to invoke a VOIP application, a chat application, an IM, or the like); or the like.

Figure 1A:
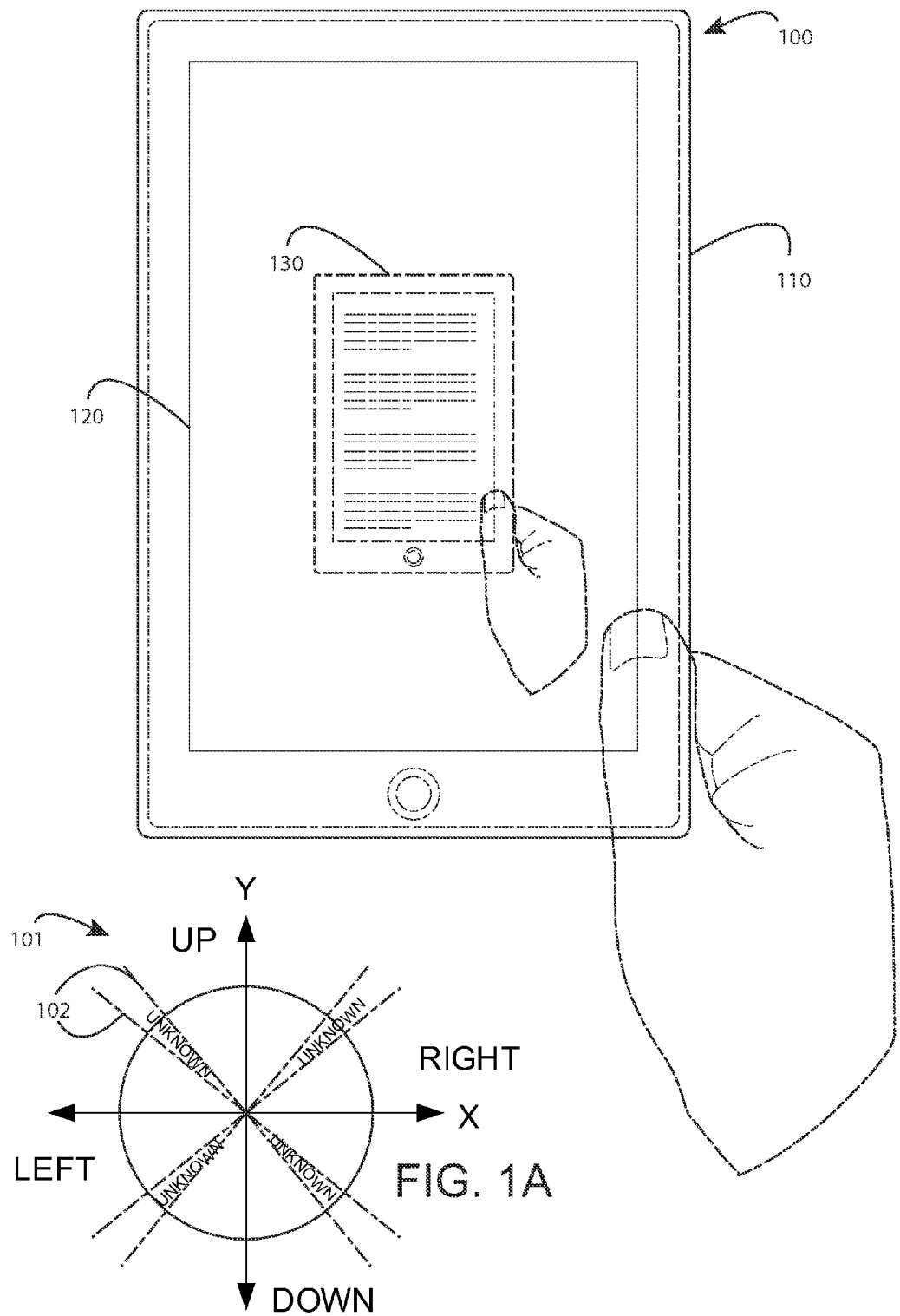
FIG. 1A is a simplified diagram illustrating a front view of handheld device according to an embodiment of the present invention.

FIG. 1A is a simplified diagram illustrating a front view of a handheld device according to an embodiment of the present invention. This diagram is merely an example, which should not unduly limit the scope of the claims herein. One of ordinary skill in the art would recognize many other variations, modifications, and alternatives. As shown, device 100 includes a housing 110 and a display 120. A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to display 120, wherein the processor is programmed to receive the change in spatial orientation of the handheld device, and wherein the processor is programmed output an indication 130 of the change in spatial orientation on display 120. Device 100 can represent a handheld tablet, e-reader, or the like. Those skilled in the art will recognize other variations, modifications, and alternatives.

In an embodiment, the MEMS inertial sensor can be manufactured using a foundry compatible process. The MEMS inertial sensor can include a MEMS gyroscope device, or a MEMS accelerometer device, or other inertial sensor, and the like. Also, the MEMS inertial sensor can be part of an integrated multi-axis system on a chip that includes devices such as inertial sensors, magnetic field sensors, pressure sensors, bio sensors, and the like. In a specific embodiment, the MEMS inertial sensor can include a three-axis integrated inertial sensor, which can be configured to sense a change in spatial orientation in three-dimensions. Those skilled in the art will recognize other variations, modifications, and alternatives.

In various embodiments, the processor can be programmed to determine the spatial orientation of device 100 in one or more axis when the user spatially reorients device 100. The processor can receive the change in spatial orientation from the MEMS inertial sensor to determine the current orientation of handheld device 100. An indication 130 of the current orientation can be depicted on display 120, which can be a LCD screen, touch-screen, or the like. Indication 130 can represent a graphical user interface (GUI) for an operating system (OS), a video game, a movie player, e-book reader, or the like. In a specific embodiment, the processor can be programmed to implement a hysteresis adjustment for outputting indications of the spatial orientation of handheld device 100.

The hysteresis adjustment can be illustrated by a orientation graph 101, shown in the lower left-hand corner of FIG. 1A. In a specific embodiment, the axes of graph 101 (top, right, down, left) can be associated with the orientation of device 100. In an embodiment, hysteresis can imply a "stickiness" or a filter that causes an output to react slowly by taking past events into consideration. Thresholds 102 can represent the thresholds for change in spatial orientation that will invoke the output of an indication 130. As shown in graph 101, there are "unknown" regions between the thresholds, of which device 130 will not output an indication 130 of spatial change. In a specific embodiment, if device 100 were to be rotated such that the positional axes (top, right, down, left) were to be aligned to the "unknown" regions, indication 130 would not change.

Examples of behaviors exhibited within the "unknown" regions can include those such as the orientation of "virtual" buttons not changing, or the orientation of playing video not changing, or the orientation of text for an e-book not changing, as well as others. Instead, changes in indication 130 would occur only in regions outside of the "unknown" regions of graph 101. More specifically, an interrupt can be generated from code executed by the processor in response to a change in orientation, which would invoke one or more application functions or the like. In various embodiments, changes in indication 130 can include reorienting the current indication, modifying the current indication, outputting a new indication, removing any indication, or any other type of action possible with indication 130. Additionally, changes in indication 130 can be associated with the execution or one or more processes in the processor within device 100. Of course, those skilled in the art will recognize other variations, modifications, and alternatives.

Also, the "unknown" regions can have variable ranges to determine the sensitivity of a processor-executed response to orientation change detection. In a specific embodiment, the ranges can be approximately symmetrical about a minimum angle threshold at angles that are multiples of approximately 45 degrees. Considering the positive x-axis of graph 101 to be at an angle value of zero, the minimum thresholds would be at approximate angle values of 45, 135, 225, and 315 degrees. With the minimum threshold, there is no "unknown" region and interrupt generation to spatial changes occur each time the threshold is crossed or tripped. The range of the "unknown" can be incrementally increased to delay the trip angles in both directions across the threshold region.

For example, the hysteresis range between the positive x and y axes can be increased to two degrees, which would create two trip angles at approximately 44 and 46 degrees. This would mean that device 100 that is oriented with its top at the positive y-axis (top) would need to be rotated to the right such that the orientation of the top side crosses the roughly 44 degree threshold to generate an interrupt. In the same manner, device 100 that is oriented with its top at the positive x-axis (right) would need to be rotated to the left such that the orientation of its top side crosses the roughly 46 degree threshold to generate an interrupt. Thus, the hysteresis adjustment causes a delay or stickiness in producing an output in either direction of spatial change.

In various embodiments, the hysteresis adjustment can have a range of roughly one degree, two degrees, three degrees, ten degrees, or any other degree value. In a specific embodiment, the range of potential degree values can be set to increased in roughly even degree values (two, four, six, eight, etc.) Additionally, the thresholds for tilting (in the z-axis direction perpendicular to the page in FIG. 1A) can also implement a hysteresis adjustment. In a specific embodiment, the ranges for tilting can be approximately symmetrical about a minimum angle threshold at approximately 180 degrees. This would cause the user to be required to tilt device 100 such that the top or bottom side is lower than horizontal to generate an interrupt. Of course, there can be other variations, modifications, and alternatives.

Many benefits are achieved by way of several embodiments of the present invention over conventional techniques. For example, the present technique provides a more user-friendly interface in which inadvertent movements will be less likely to execute unwanted application functions. Additionally, the method provides a process and system that can assure correct detection and interrupt generation. A spatial detection algorithm implementing a hysteresis evaluation can save CPU cycles, save power, lower current, and simply code. Also, the hysteresis evaluation can allow a CPU to make faster decisions and provide a low latency for the display. Preferably, the embodiments of the invention provide for an improved handheld device and related applications for a variety of uses. In one or more embodiments, sensors, MEMS and related applications, may be integrated on one or more CMOS device structures. Depending upon the embodiment, one or more of these benefits may be achieved. These and other benefits will be described in more throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims.

Figure 1B:
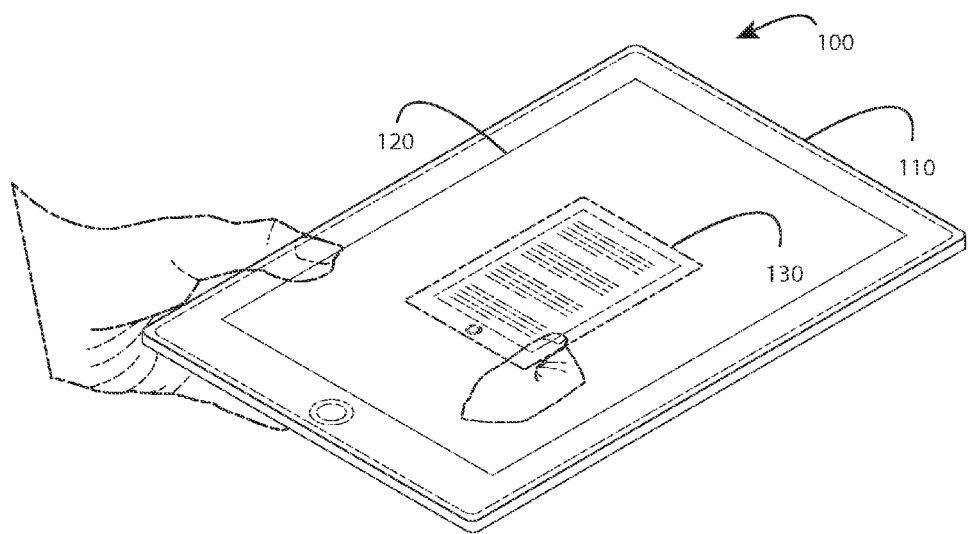
FIG. 1B is a simplified diagram illustrating a perspective view of handheld device according to an embodiment of the present invention.
Figure 1B:
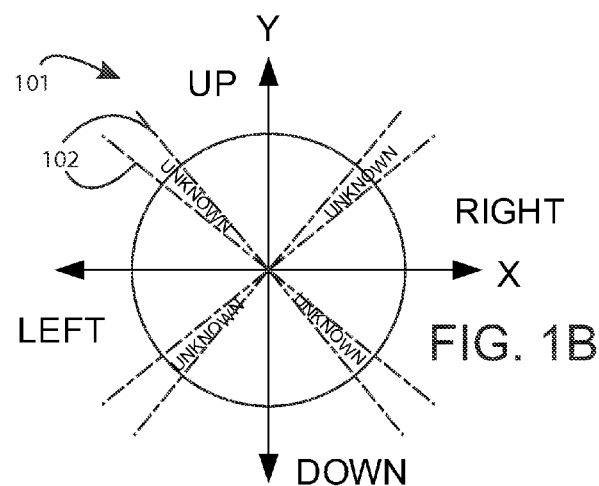

FIG. 1B is a simplified diagram illustrating a perspective view of a handheld device according to an embodiment of the present invention. This diagram is merely an example, which should not unduly limit the scope of the claims herein. One of ordinary skill in the art would recognize many other variations, modifications, and alternatives. As shown, device 100 includes a housing 110 and a display 120. A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to display 120, wherein the processor is programmed to receive the change in spatial orientation of the handheld device, and wherein the processor is programmed output an indication 130 of the change in spatial orientation on display 120. A detailed description of the elements in device 100 can be found above in the description for FIG. 1A. Those skilled in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 2A:
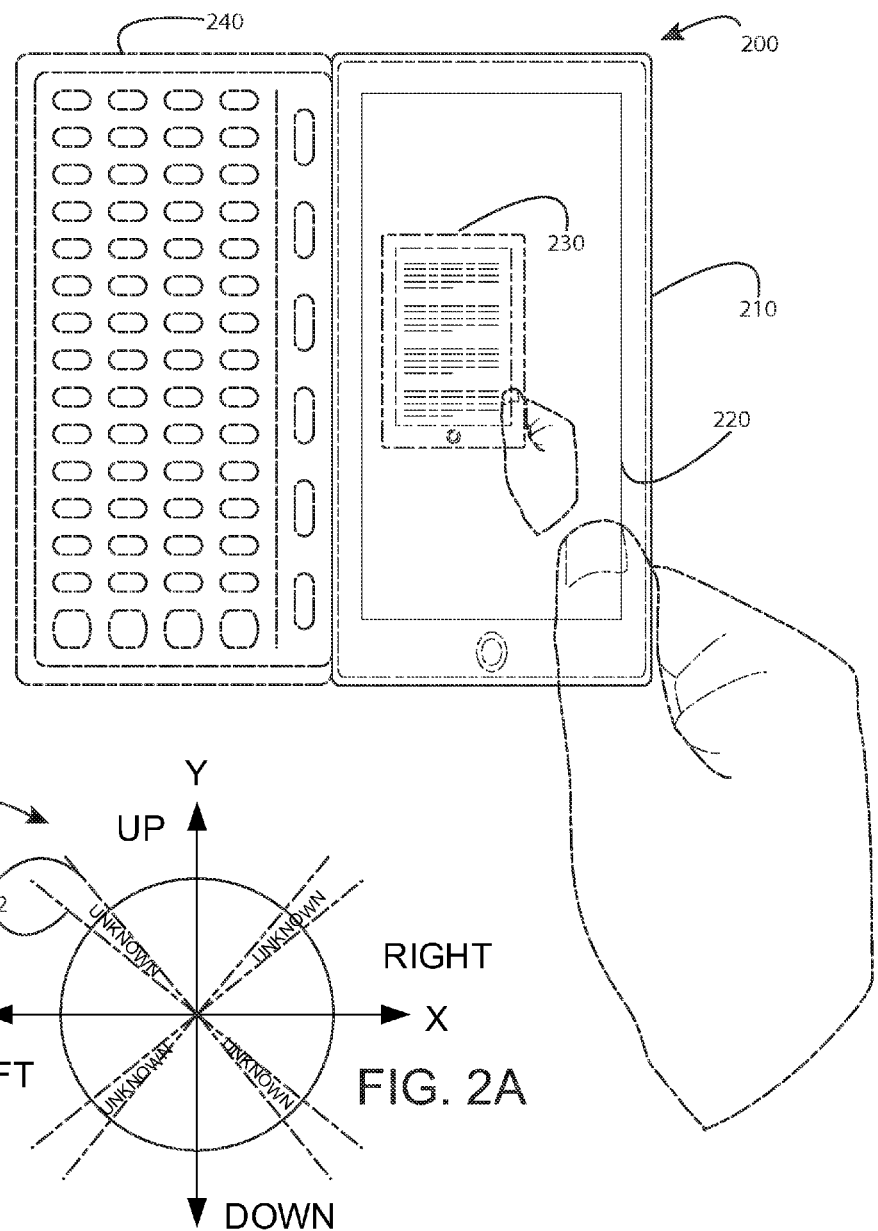
FIG. 2A is a simplified diagram illustrating a front view of a handheld device according to an embodiment of the present invention.

FIG. 2A is a simplified diagram illustrating a front view of a handheld device according to an embodiment of the present invention. This diagram is merely an example, which should not unduly limit the scope of the claims herein. One of ordinary skill in the art would recognize many other variations, modifications, and alternatives. As shown, device 200 includes a housing 210 (analogous to housing 110) and a display 220 (analogous to display 120). A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to display 220, wherein the processor is programmed to receive the change in spatial orientation of the handheld device, and wherein the processor is programmed output an indication 230 (analogous to indication 130) of the change in spatial orientation on display 220. A detailed description of the elements in device 200 can be found above in the description for FIG. 1A. A graph 201 with thresholds 202 can also be analogous to graph 101 and thresholds 102 in describing the behaviors associated with the hysteresis adjustment. Device 200 can represent a handheld cell phone, wireless communication device, or the like. Additionally, device 200 can include a keyboard 240, which can be foldable or retractable. Those skilled in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Figure 2B:
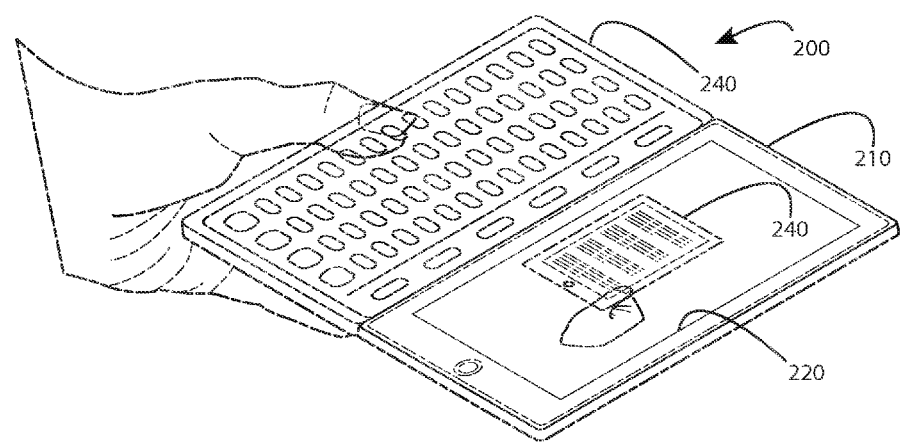
FIG. 2B is a simplified diagram illustrating a perspective view of a handheld device according to an embodiment of the present invention.
Figure 2B:
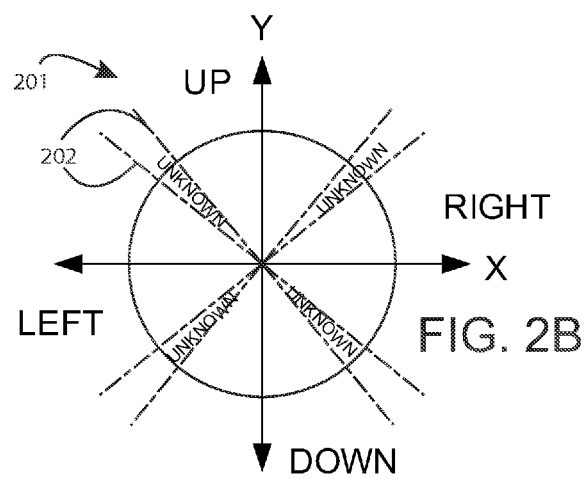

FIG. 2B is a simplified diagram illustrating a perspective view of a handheld device according to an embodiment of the present invention. This diagram is merely an example, which should not unduly limit the scope of the claims herein. One of ordinary skill in the art would recognize many other variations, modifications, and alternatives. As shown, device 200 includes a housing 210 (analogous to housing 110) and a display 220 (analogous to display 120). A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to display 220, wherein the processor is programmed to receive the change in spatial orientation of the handheld device, and wherein the processor is programmed output an indication 230 (analogous to indication 130) of the change in spatial orientation on display 220. A detailed description of the elements in device 200 can be found above in the description for FIG. 1A. A graph 201 with thresholds 202 can also be analogous to graph 101 and thresholds 102 in describing the behaviors associated with the hysteresis adjustment. Device 200 can represent a handheld cell phone, wireless communication device, or the like. Additionally, device 200 can include a keyboard 240, which can be foldable or retractable. Those skilled in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

FIGS. 3A-F are simplified diagrams illustrating the operation of a handheld device according to an embodiment of the present invention. This diagram is merely an example, which should not unduly limit the scope of the claims herein. One of ordinary skill in the art would recognize many other variations, modifications, and alternatives. As shown, device 100 includes a housing 110 and a display 120. A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to display 120, wherein the processor is programmed to receive the change in spatial orientation of the handheld device, and wherein the processor is programmed output an indication 130 of the change in spatial orientation on display 120. A detailed description of the elements in device 100 can be found above in the description for FIG. 1A. Device 100 can represent a handheld tablet, e-reader, or the like. Those skilled in the art will recognize other variations, modifications, and alternatives.

Figure 3A:
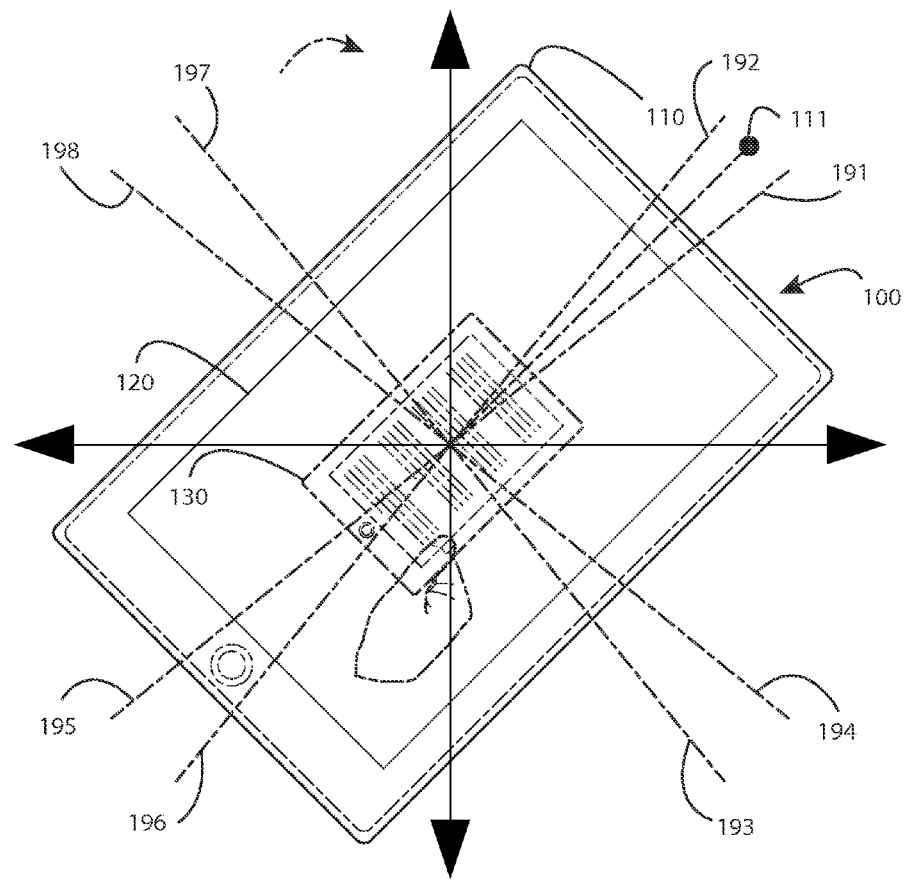
FIGS. 3A-F are simplified diagrams illustrating the operation of a handheld device according to an embodiment of the present invention.
Figure 3A:
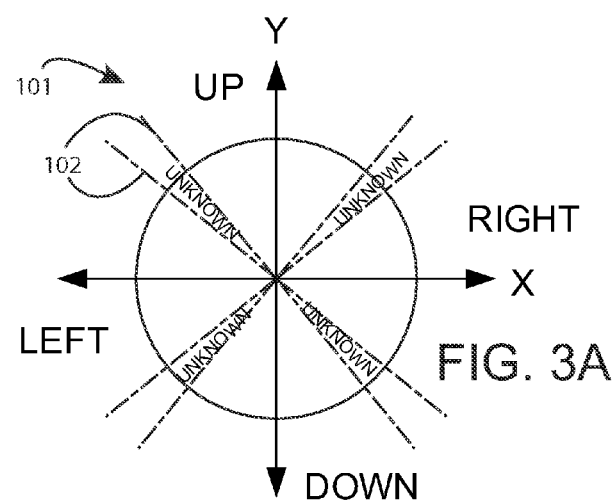

As shown in FIG. 3A, device 100 is oriented with its top side orientation 111 in the "unknown" region between threshold 191 and 192. In a specific embodiment, thresholds 191 and 192 can be trip angles that are determined by the hysteresis adjustment range as described above in FIG. 1A. In the previously described example, trip angle 191 can be roughly 44 degrees and trip angle 192 can be roughly 46 degrees, but both trip angles can have other angle values depending on the magnitude of the hysteresis adjustment. In an embodiment, the current orientation, being the first orientation, is associated with a first indication 130 representative of a portrait type display. Thus, being oriented in the "unknown" region will not cause the processor to generate an interrupt in response to spatial change.

Figure 3B:
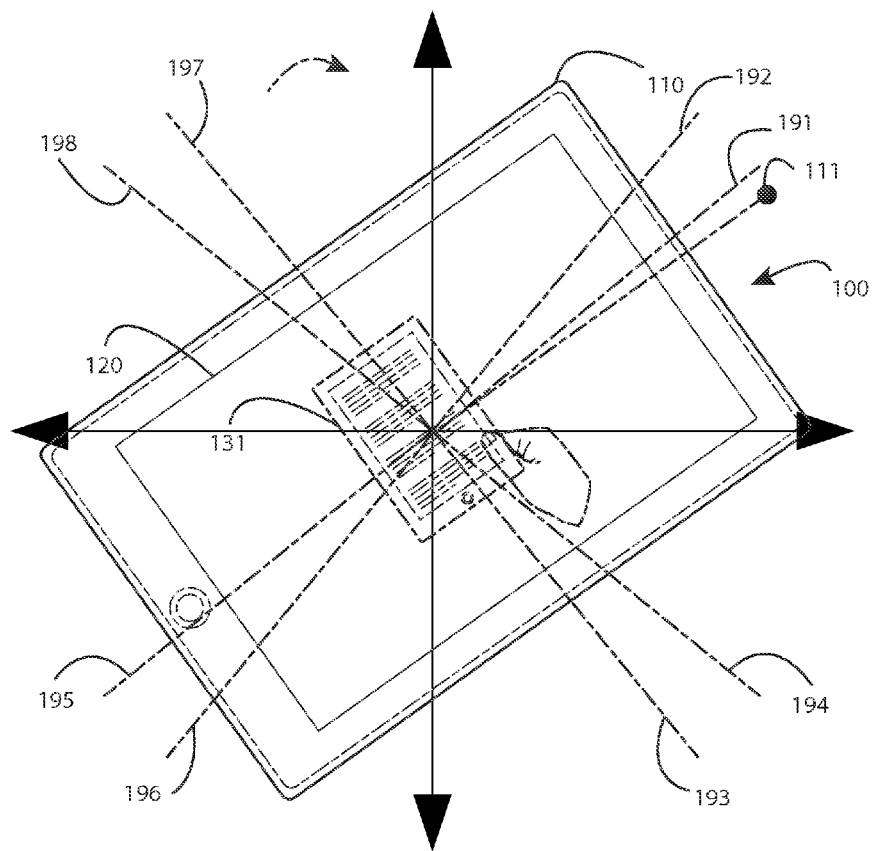
Figure 3B:
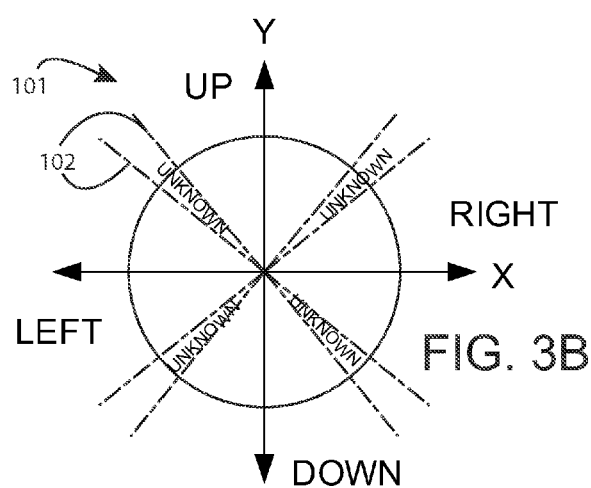

However, device 100 crosses trip angle 191 between a first orientation (top 111 oriented upwards) and a second orientation (top 111 oriented to the right) in FIG. 3B. By crossing the threshold, an interrupt can be generated, which can cause a change from indication 130 to indication 131. In a specific embodiment, this change is represented by second indication 131 rotating to a landscape type display.

Figure 3C:
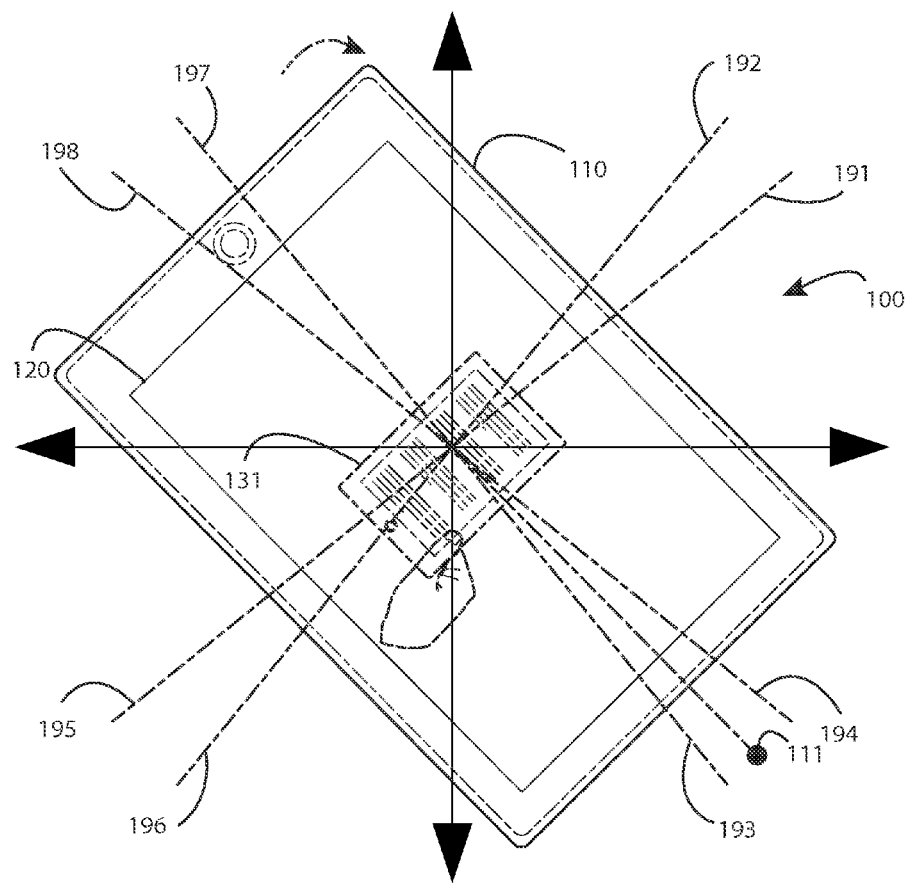
Figure 3C:
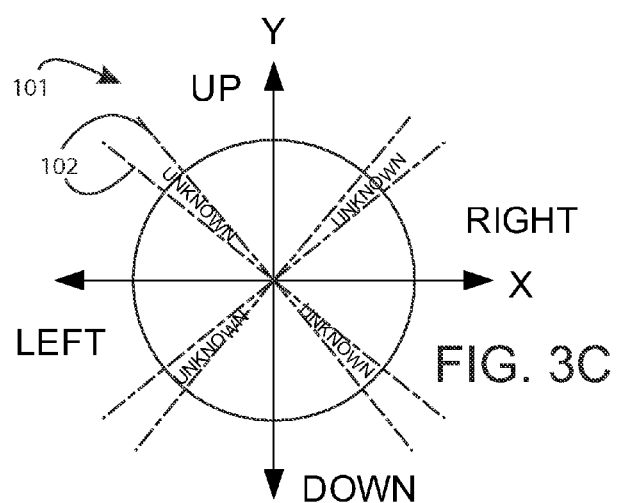

In FIG. 3C, device 100 remains with its top orientation 111 in another "unknown" region between thresholds 193 and 194 between a second orientation (top 111 oriented to the right) and a third orientation (top 111 oriented towards the downward direction). Using the example in FIG. 1A, threshold 193 can be a trip angle roughly at 314 degrees and threshold 194 can be a trip angle roughly at 316 degrees. Of course, the trip angle values can vary with the hysteresis adjustment. Similarly to FIG. 3A, no interrupt will be generated in this position.

Figure 3D:
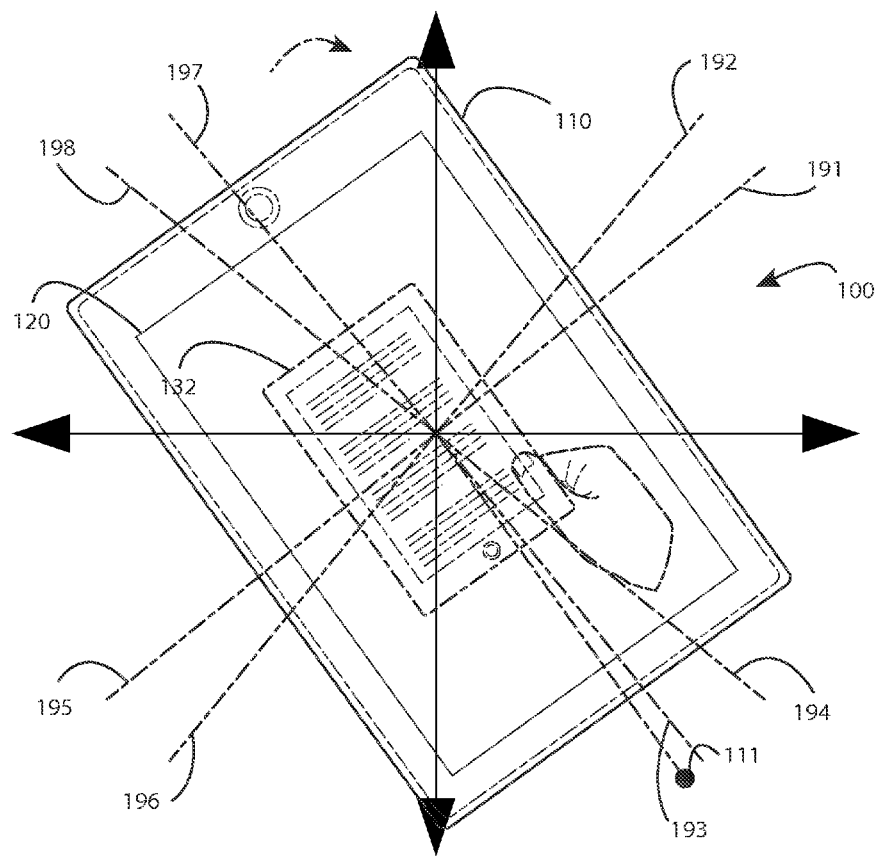
Figure 3D:
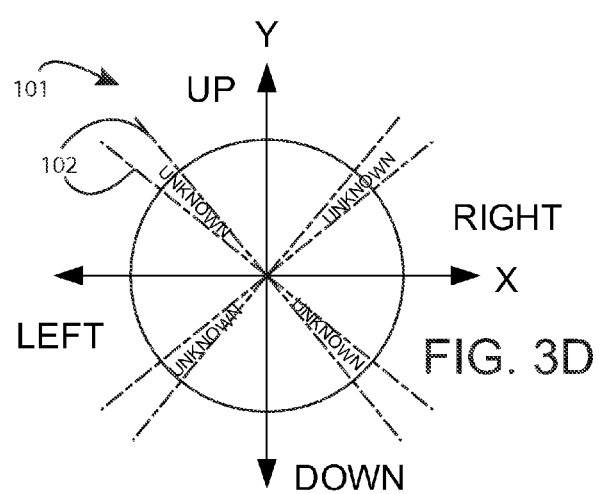

Similar to FIG. 3B, FIG. 3D shows device 100 crossing another threshold with its top orientation 111 crossing the trip angle 193. Indication 131 also changes to third indication 132 with the trigger of an interrupt, and, in this case, represents a third orientation with an upside-down portrait type display compared to the first orientation. Furthermore, another interrupt can be generated when device 100 has its top orientation 111 rotated past thresholds 195 and 197, which can produce a fourth indication 133 of a fourth orientation (top 111 oriented to the left) representative of an upside-down landscape display compared to the second orientation and an indication 130 of the first orientation representative of a portrait type display, respectively.

Figure 3E:
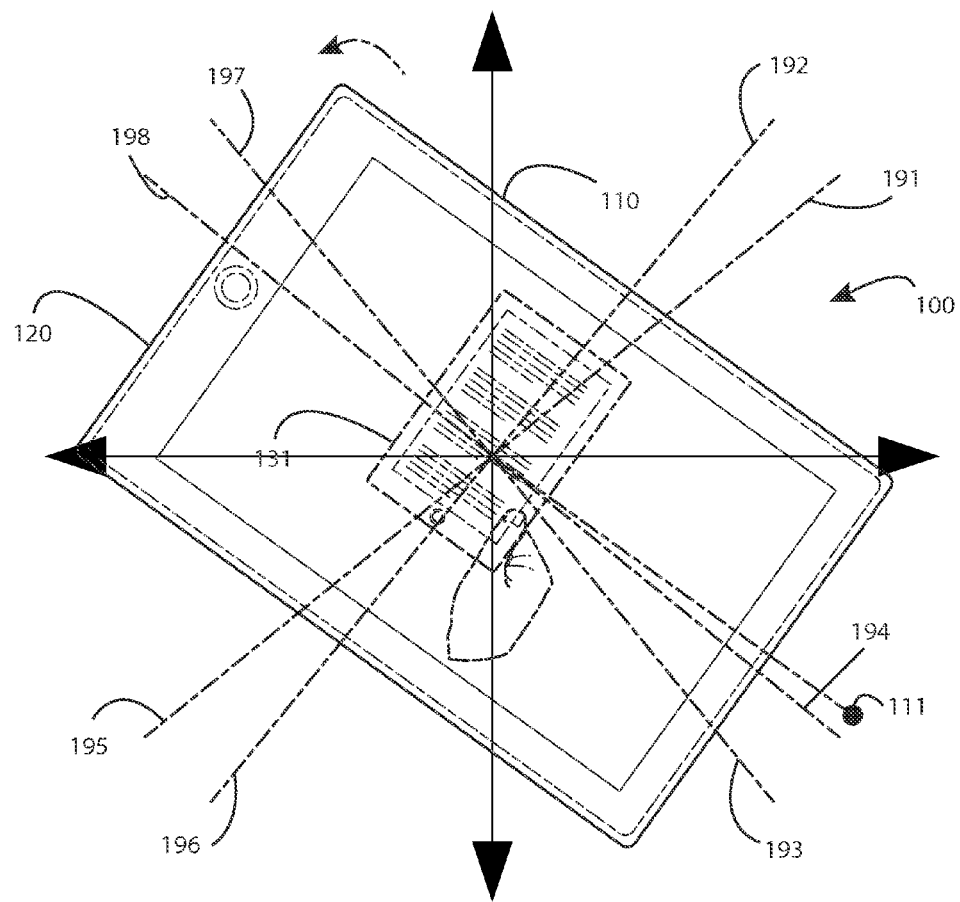
Figure 3E:
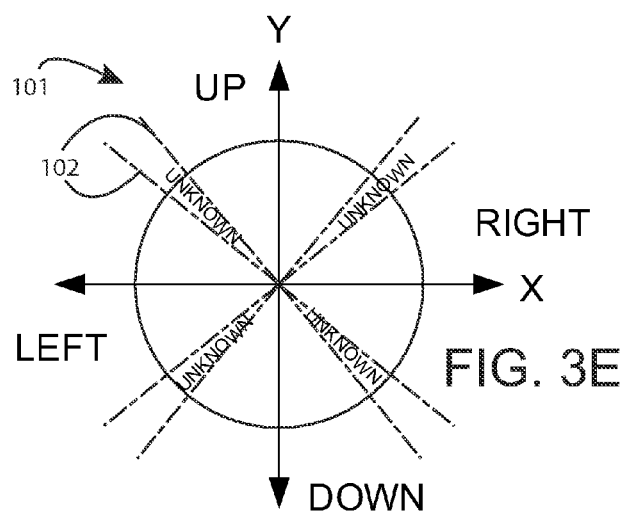
Figure 3F:
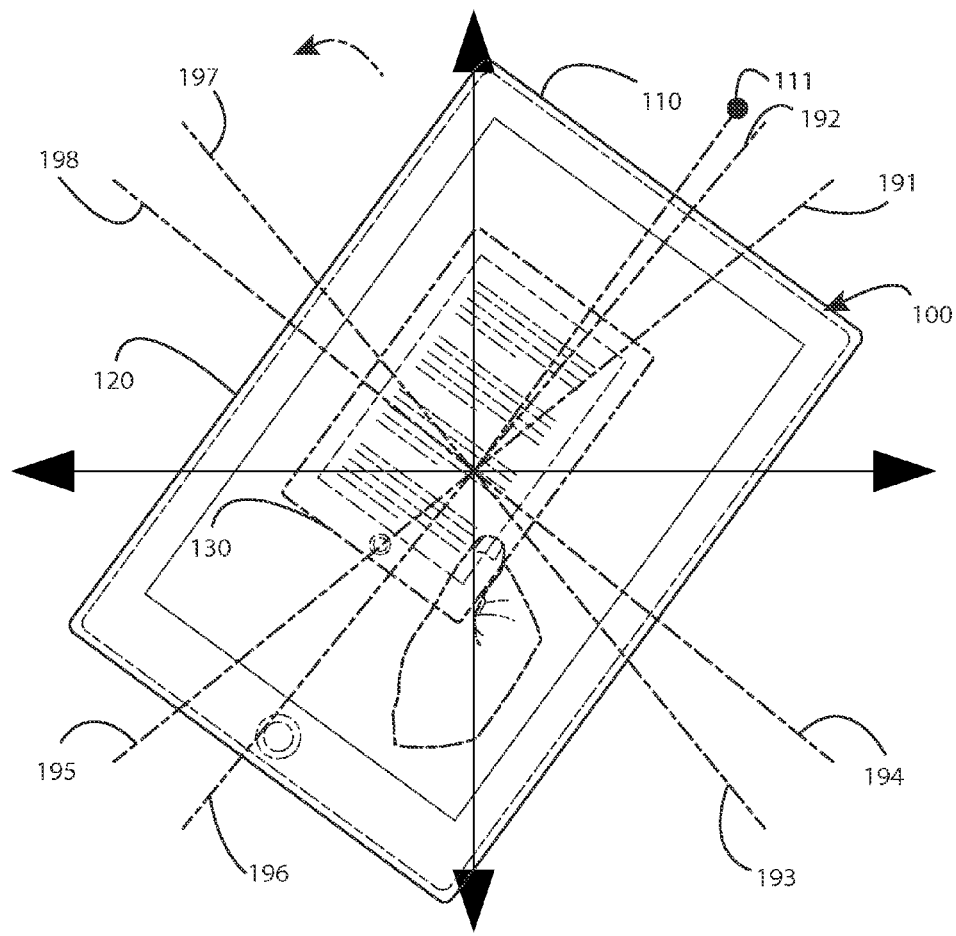
Figure 3F:
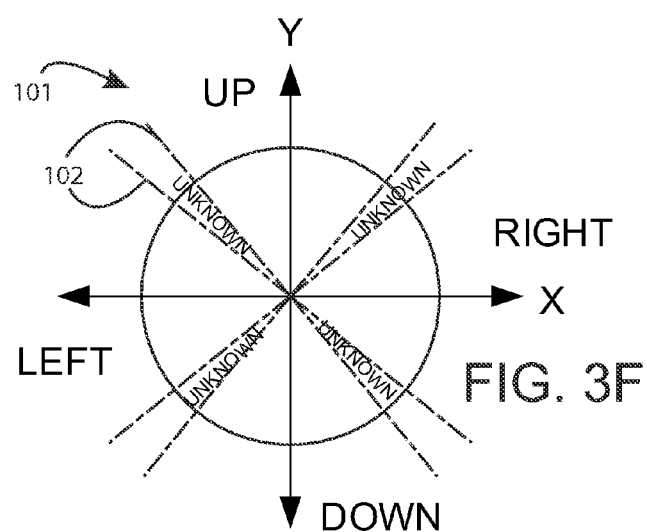
Figure 4A:
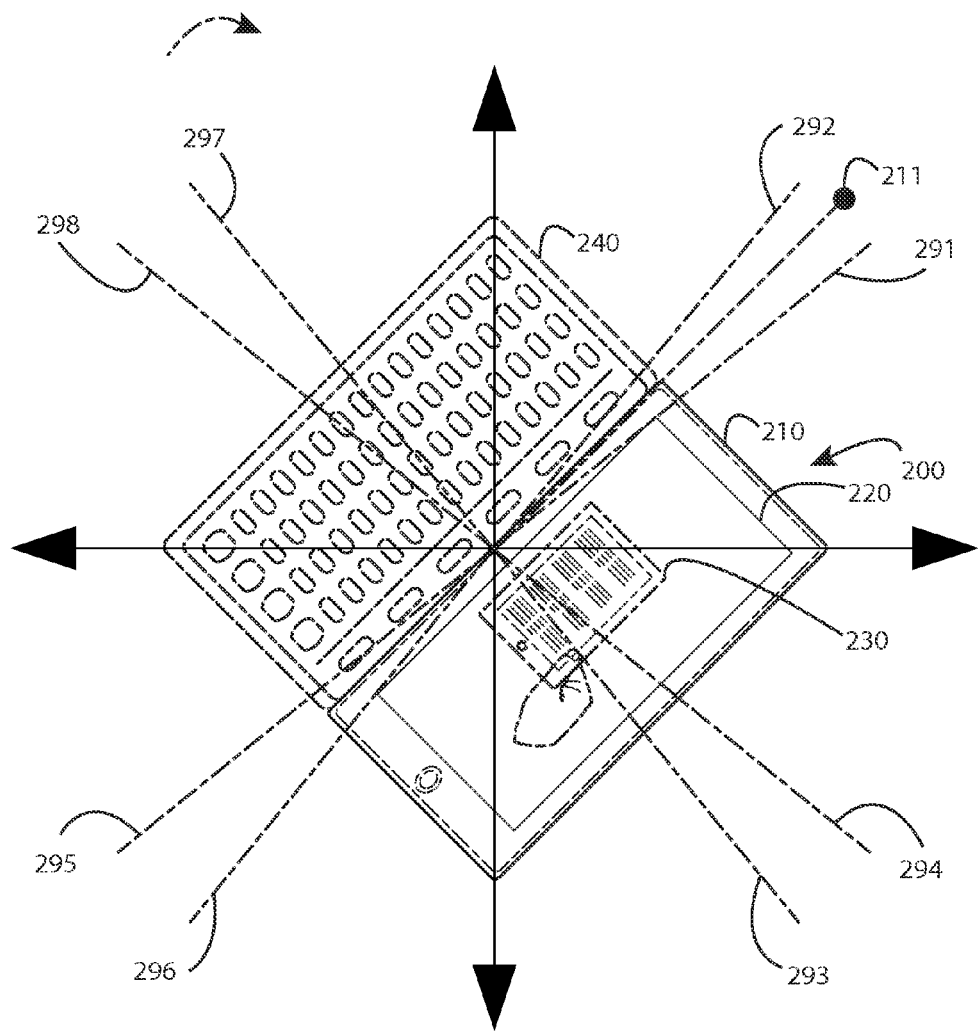
FIGS. 4A-F are simplified diagrams illustrating the operation of a handheld device according to an embodiment of the present invention.
Figure 4A:
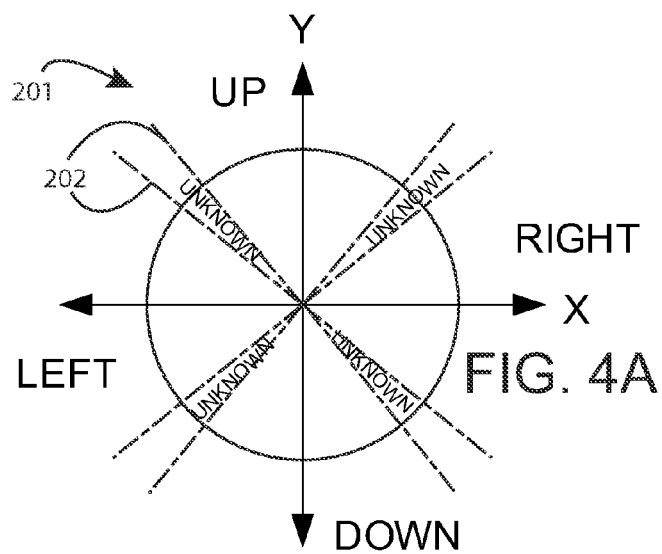
Figure 4B:
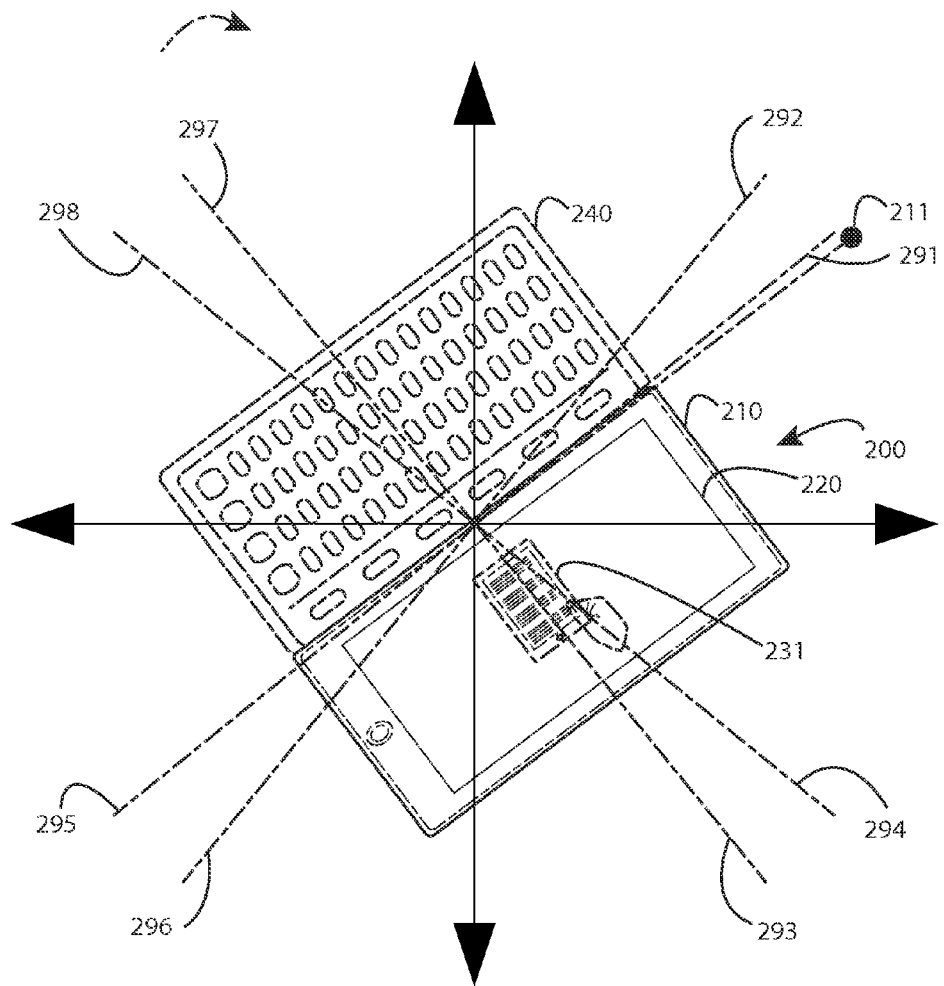
Figure 4B:
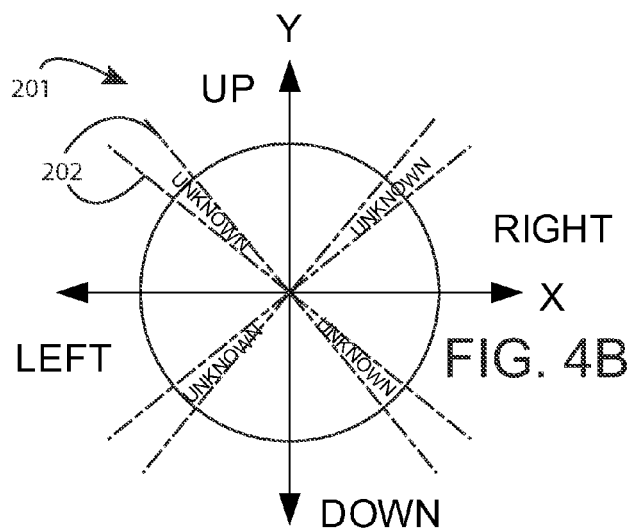
Figure 4C:
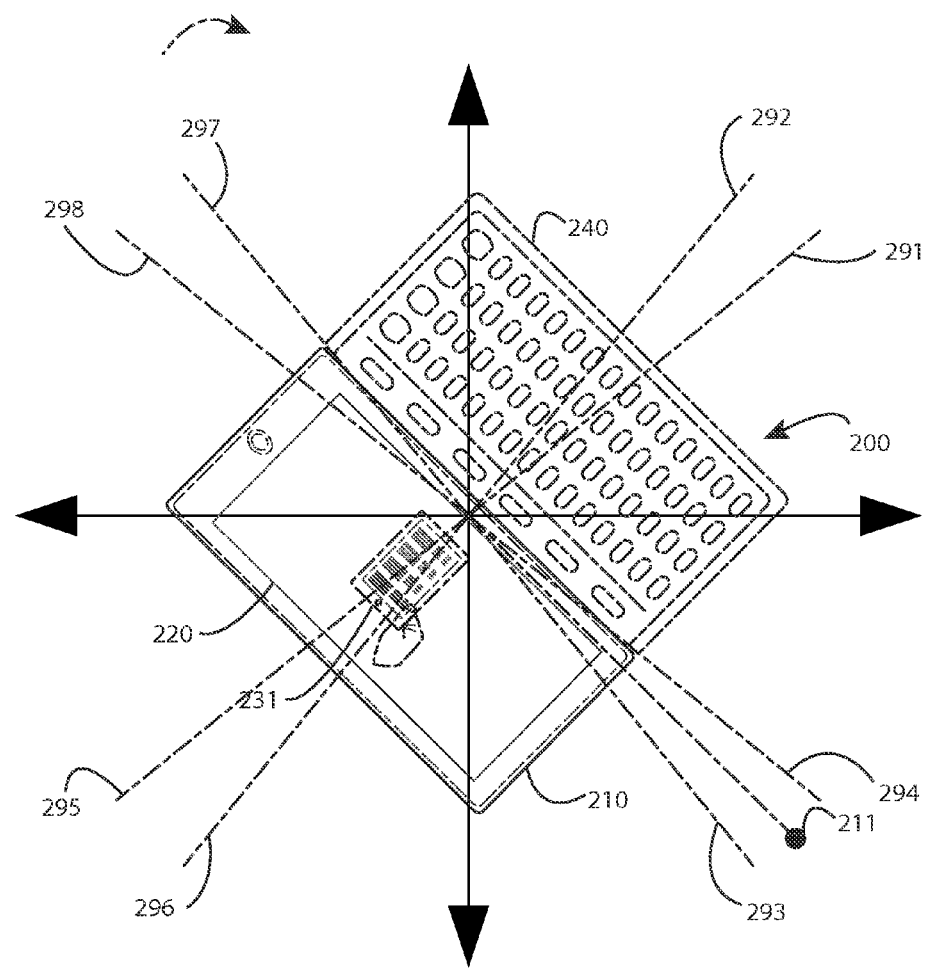
Figure 4C:
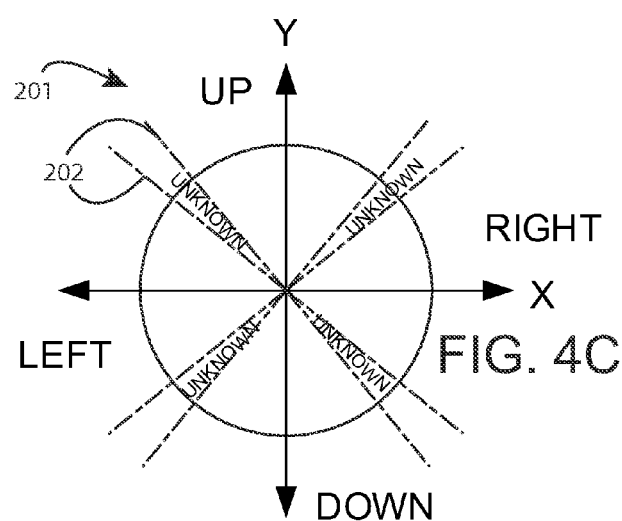
Figure 4D:
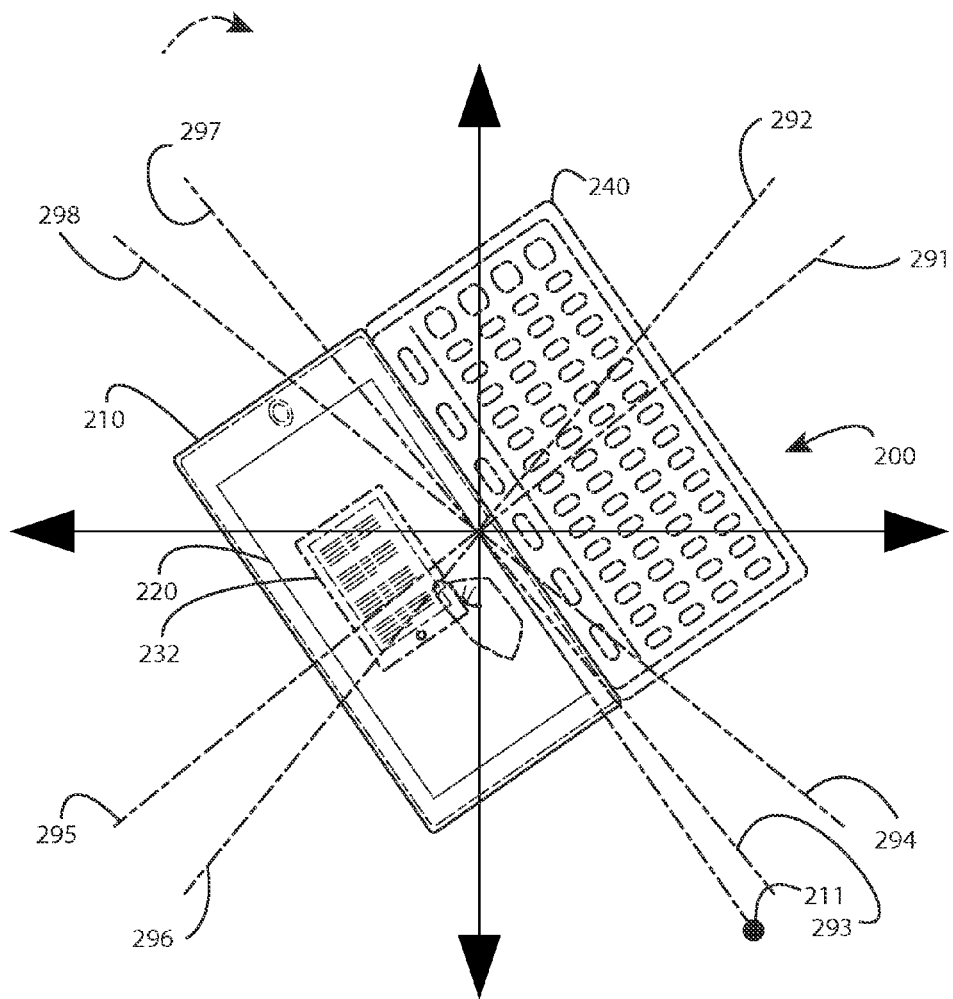
Figure 4D:
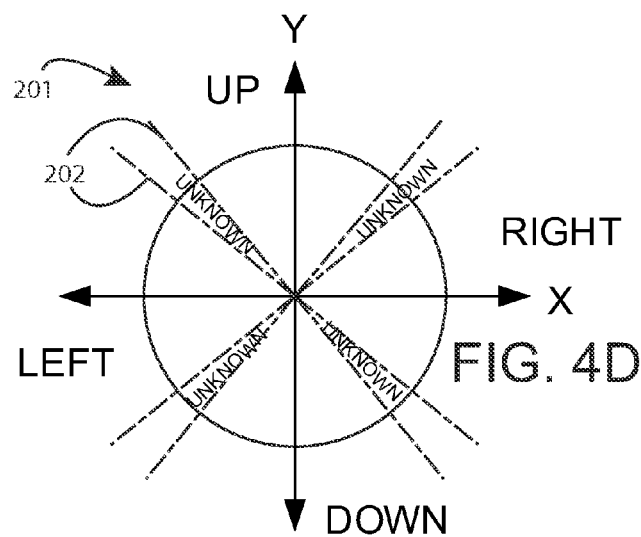
Figure 4E:
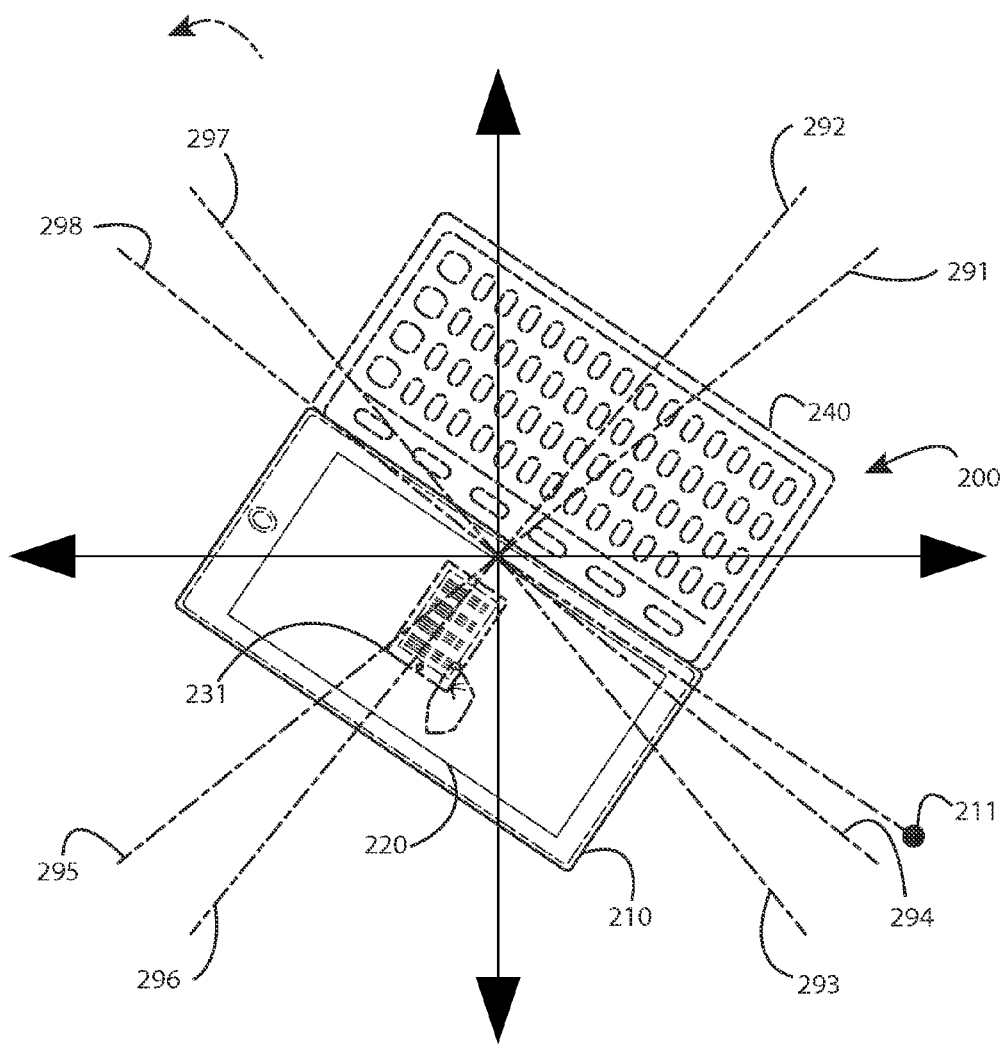
Figure 4E:
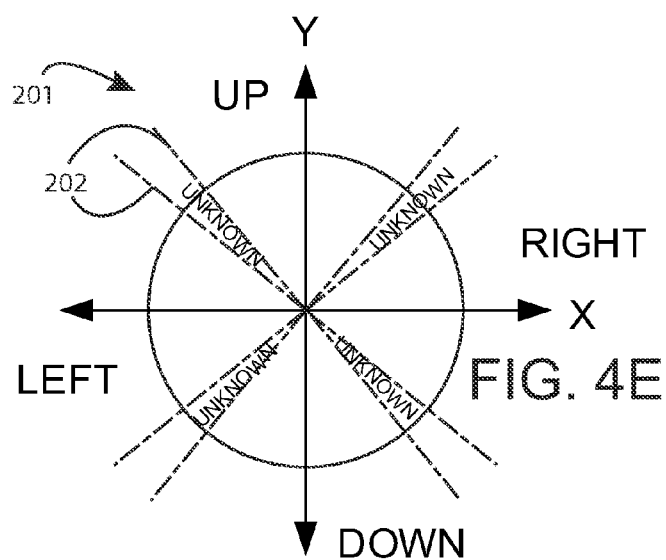
Figure 4F:
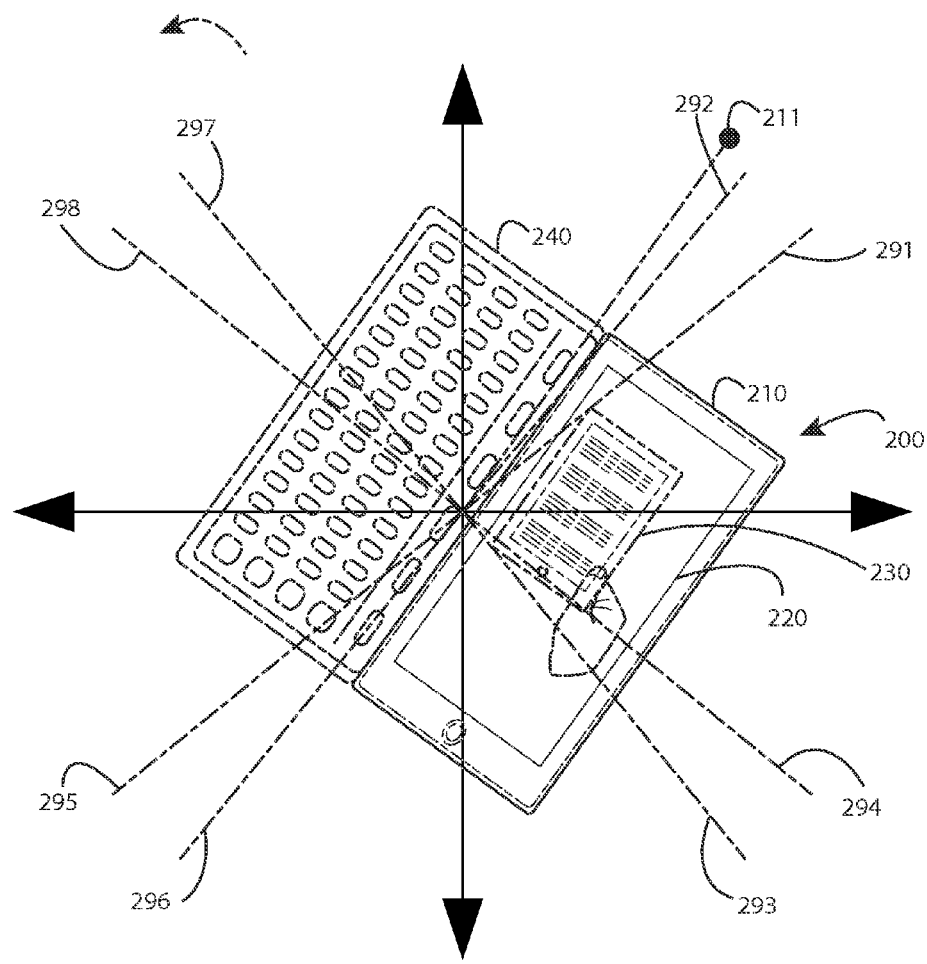
Figure 4F:
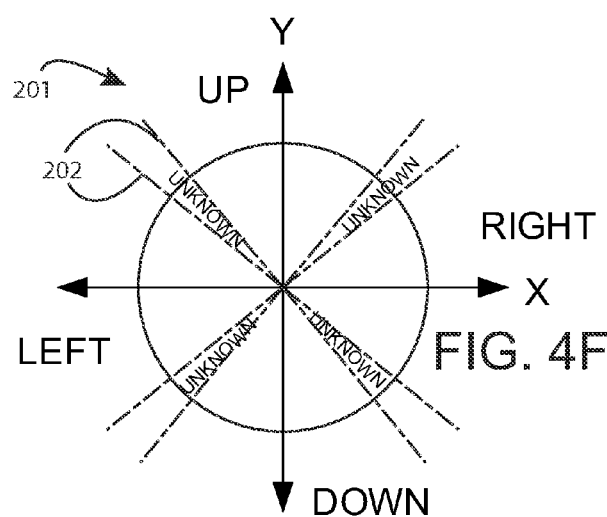

FIGS. 3E and 3F demonstrate the operation of the hysteresis adjustment in the reverse direction (to the left). A rotation from the third orientation the second orientation while crossing threshold 194 can generate an interrupt and change third indication 132 to second indication 131 to display in landscape mode. A rotation from the second orientation to the first orientation while crossing threshold 192 can generate an interrupt and change second indication 131 to first indication 130 to display in portrait mode. Similar interrupt generations can occur while rotating to the left while crossing thresholds 198 and 196 as well. In various embodiments, if the user were to cross multiple thresholds that can generate interrupts, each interrupt can be addressed in turn, or only the latest interrupt can be taken into account. Of course, the executed processes invoked by the generation of the interrupt can have many different effects that range from, but are not limited to, manipulating indications, to removing indications, to outputting additional indications on display 120. Those skilled in the art will recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

FIGS. 4A-F are simplified diagrams illustrating the operation of a handheld device according to an embodiment of the present invention. This diagram is merely an example, which should not unduly limit the scope of the claims herein. One of ordinary skill in the art would recognize many other variations, modifications, and alternatives. As shown, device 200 includes a housing 210 (analogous to housing 110) and a display 220 (analogous to display 120). A device may include a MEMS inertial sensor disposed within the housing, wherein the MEMS inertial sensor is configured to sense a change in spatial orientation when the user reorients the handheld device. A system may include a processor disposed within the housing and coupled to the MEMS inertial sensor and to display 220, wherein the processor is programmed to receive the change in spatial orientation of the handheld device, and wherein the processor is programmed output an indication 230 (analogous to indication 130) of the change in spatial orientation on display 220. A detailed description of the elements in device 200 can be found above in the description for FIG. 1A. A graph 201 with thresholds 202 can also be analogous to graph 101 and thresholds 102 in describing the behaviors associated with the hysteresis adjustment. Device 200 can represent a handheld cell phone, wireless communication device, or the like. Additionally, device 200 can include a keyboard 240, which can be foldable or retractable. Those skilled in the art will recognize other variations, modifications, and alternatives.

Similarly to FIGS. 3A-F, FIGS. 4A-F can have thresholds 291-298 (analogous to thresholds 191-198) and indications 230-233 (analogous to indications 130-133). A detailed description of the operation of device 200 can be found above in the description for the operation of device 100 shown in FIGS. 3A-F.

It is also understood that the examples and embodiments described herein are for illustrative purposes only and that various modifications or changes in light thereof will be suggested to persons skilled in the art and are to be included within the spirit and purview of this application and scope of the appended claims.

Figure 5:
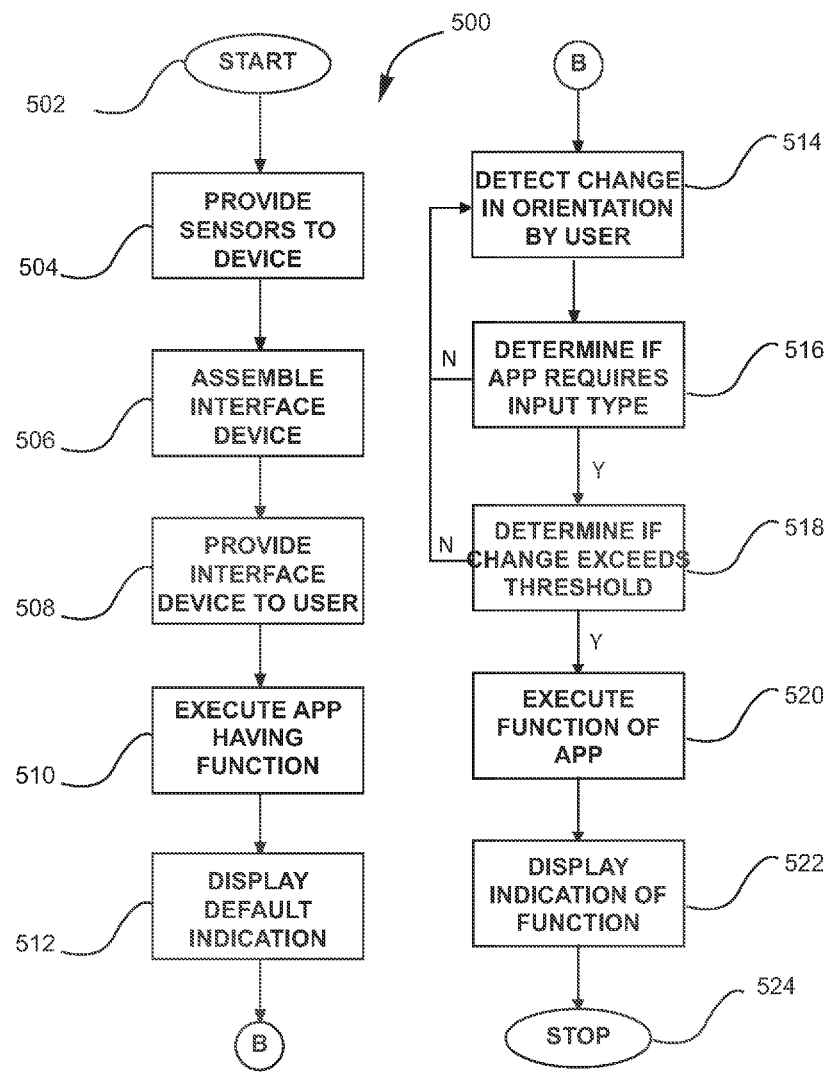
FIG. 5 is a simplified flow diagram illustrating a method of operating a handheld device according to an embodiment of the present invention.

FIG. 5 is a simplified flow diagram illustrating a method of operating a handheld device according to an embodiment of the present invention. For illustrative purposes only, reference to elements in FIG. 1A may be provided in the discussion below merely for the sake of convenience.

As shown in FIG. 5, an embodiment of the present method can be briefly outlined below.

1. Start;
2. Provide one or more physical sensors to a user data interface device;
3. Assemble user data interface device;
4. Provide user data interface device to a user;
5. Execute software application having function associated with orientation;
6. Display indication representative of a default state on device display;
7. Detect a change in spatial orientation in response to user manipulation;
8. Form third conductive material(s) overlying substrate contact region(s);
9. Determine if application requires orientation change input (upon detection);
10. Determine if orientation change exceeds a threshold (upon requiring input);
11. Execute function of software application (upon exceeding threshold)
12. Display indication associated with execution of function; and
13. Stop.

These steps are merely examples and should not unduly limit the scope of the claims herein. As shown, the above embodiment of a method provides a method of operating a handheld device implementing a hysteresis adjustment according to an embodiment of the present invention. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 5, method 500 begins at start, step 502. Embodiments of the present method provide a fabrication method for forming an integrated electronic device using vertical mounting with interconnections. Many benefits are achieved by way of several embodiments of the present invention over conventional techniques. For example, the present technique provides a more user-friendly interface in which inadvertent movements will be less likely to execute unwanted application functions. Additionally, the method provides a process and system that can assure correct detection and interrupt generation. A spatial detection algorithm implementing a hysteresis evaluation can save CPU cycles, save power, lower current, and simply code. Also, the hysteresis evaluation can allow a CPU to make faster decisions and provide a low latency for the display. Preferably, the embodiments of the invention provide for an improved handheld device and related applications for a variety of uses. In one or more embodiments, sensors, MEMS and related applications, may be integrated on one or more CMOS device structures. Depending upon the embodiment, one or more of these benefits may be achieved.

Following step 702, method 500 involves providing physical sensors to a user data interface device, step 504. In various embodiments of the present invention, physical sensors, which can include a variety of MEMS sensors such as inertial sensors, are provided as part of a computing device 100. For example, physical sensors developed by the assignee of the present patent application are provided to an assembly entity to form computing device 100. Computing device 100 is then assembled, step 506, and provided for the user, step 508. As described above, in various embodiments, computing device 100 may be a cell-phone, internet access device, a tablet computer, a personal media player/viewer, or the like running an appropriate operating system along with software applications. Further details can be found above in the description for FIG. 1A. These steps may be performed at device manufacturing time whereas the following steps may be performed by a user of the device, or the like.

Next, a user may run or execute a software application upon computing device 100, step 510. In various embodiments, the software application may be an operating system, a program, or the like. In such software, a user input or triggering event is required to invoke a function on computing device 100. As merely an example, a function may be taking a picture, answering or terminating a phone call; initiating a VOIP application, chat program, IM, or the like; initiating a data logging program; or the like. In various embodiments, the user may be prompted to perturb computing device 100 to invoke the function. For example, an output audio message may prompt the user, such as, "tap the phone anywhere to take a picture;" a display image may prompt the user, such as a sequential display of lights in a drag strip "Christmas tree" sequence; and the like. In an embodiment, a default indication, which can be associated with a menu of an OS, a video player, game, or the like, can be outputted to the display of the device, step 512.

In various embodiments, computing device 100 is perturbed, step 514. In some examples, the user may directly perturb computing device 100, for example, the user may physically displace, accelerate, rotate and/or move computing device 100 itself (e.g. tapping on the interface device); the user may perturb computing device 100 indirectly (e.g. tapping on a table upon which the interface device is resting); or the like. In other examples, the user may indirectly cause the perturbation, for example, a computing device 100 and a magnetic source are moved towards or away from each other, the air pressure may decrease as the user flies in an airplane or as the weather changes, or the like.

In various embodiments, a type and magnitude of the perturbation are determined by the respective sensors, typically in parallel. For example, an acceleration in the x, y or z axis may be determined by x, y, and z axis accelerometers, a tilt, pan, or roll may be determined by x, y and z rotation sensors, a change in pressure may be determined by a pressure sensor, a change in magnetic field in may be determined in x, y and z axis by separate magnetic sensors, and the like. As discussed above, various embodiments of the present invention may be embodied as a three-axis, six-axis, nine-axis, ten-axis or the like MEMS device currently being developed by the assignee of the present patent application.

In response to the perturbations, computing device 100 determines whether the perturbation are of the type expected/required by the software application, step 516. For example, if computing device 100 is expecting an acceleration in the z-axis, a change is magnetic field may not be deemed to be the proper type of perturbation; if computing device 100 is expecting a change in GPS coordinates, a rotation may not be deemed to be the proper type of perturbation, or the like. In various embodiments, if the perturbation is the desired type, the process continues in step 518, otherwise, the perturbation may be ignored.

In some embodiments of the present invention, the magnitudes of the perturbations may be compared to one or more thresholds, step 518. More specifically, in various embodiments, it may be desirable that the magnitudes of the perturbations be sufficient to reduce the chance of accidental or unintended user input. For example, in one application, a user can knock upon a table to answer call on a cell phone resting upon the table. In such an application, it may be desirable that a firm rotation or tilt be sensed, before a display indication is altered, otherwise, accidental movements can cause unwanted change, such as the rotation of text of an e-book. As other examples, in some embodiments, a change in sensed magnetic field may be small enough to be considered merely noise, thus such changes may be ignored; a change in sensed pressure differential may be too small to be considered a valid pressure differential; or the like.

In various embodiments, if the magnitude of the perturbation exceeds the threshold, the desired function may be performed, step 520. Further details can be found in the description for FIGS. 3A-F. In light of the present patent disclosure, one of ordinary skill in the art will recognize many different types of applications may be performed within embodiments of the present invention.

Merely by example, one application may be recording rotational or orientation data in three-dimensions with respect to time. In such an example, the user may invoke the software application on the computing device, however, the actual recording of the data is initiated in step 520, only after a sufficient change in spatial orientation is sensed. Such an application may be useful for data logging purposes for a vehicle (e.g. a black box), may be useful for data logging for sports activities (e.g. monitoring movement of a golf club, fishing rod, racquet), may be useful for data logging of freight (e.g. monitoring how roughly freight is handled), or the like. In various examples, other types of perturbations other than the triggering perturbation may also be logged, in the embodiments above. For example, for data logging of sports activities, the rotation in three axis of a golf club may also be recorded in addition to the linear acceleration of the golf club, in three-dimensions.

The above sequence of processes provides a fabrication method for operating a handheld device implementing a hysteresis adjustment according to an embodiment of the present invention. As shown, the embodiment of the method uses a combination of steps including providing an assembled device having physical sensors to a user, detecting changes in spatial orientation, and determining whether an detected input is required to invoke an executable process to produce an indication to be outputted to the display of the device. Other alternatives can also be provided where steps are added, one or more steps are removed, or one or more steps are provided in a different sequence without departing from the scope of the claims herein. Further details of the present method can be found throughout the present specification.

Figure 6:
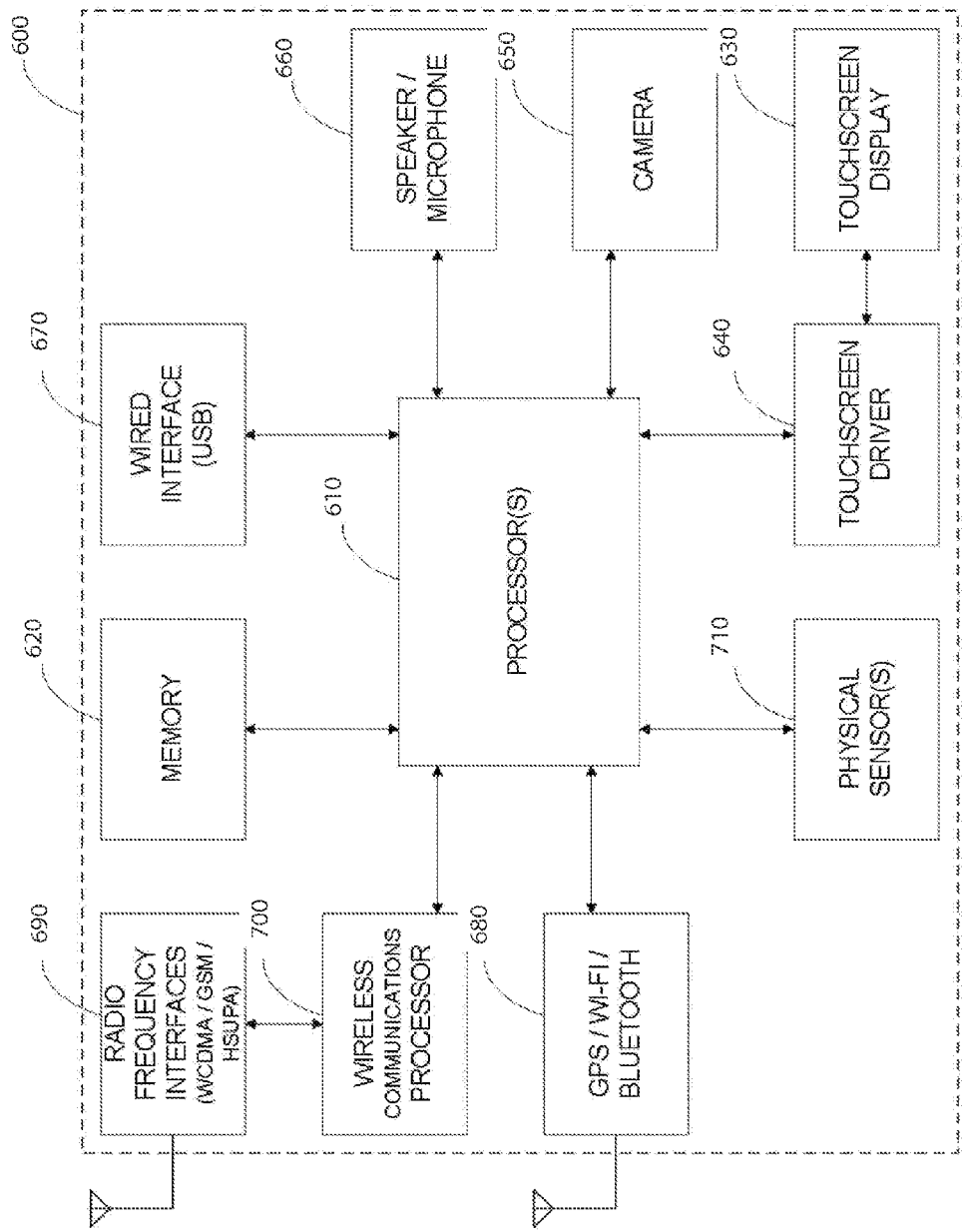
FIG. 6 is a functional block diagram of various embodiments of the present invention.

FIG. 6 illustrates a functional block diagram of various embodiments of the present invention. In FIG. 6, a computing device 600 typically includes an applications processor 610, memory 620, a touch screen display 630 and driver 640, an image acquisition device 650, audio input/output devices 660, and the like. Additional communications from and to computing device are typically provided by via a wired interface 670, a GPS/Wi-Fi/Bluetooth interface 680, RF interfaces 690 and driver 700, and the like. Also included in various embodiments are physical sensors 710.

In various embodiments, computing device 600 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 600 may include one or more processors 610. Such processors 610 may also be termed application processors, and may include a processor core, a video/graphics core, and other cores. Processors 610 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 620 may include different types of memory (including memory controllers), such as flash memory (e.g. NOR, NAND), pseudo SRAM, DDR SDRAM, or the like. Memory 620 may be fixed within computing device 600 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 630 and driver 640 may be based upon a variety of later-developed or current touch screen technology including resistive displays, capacitive displays, optical sensor displays, electromagnetic resonance, or the like. Additionally, touch screen display 630 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 650 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 660 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 610 to enable the user to operate computing device 600 by stating voice commands. Additionally, a speech engine may be provided in various embodiments to enable computing device 600 to provide audio status messages, audio response messages, or the like.

In various embodiments, wired interface 670 may be used to provide data transfers between computing device 600 and an external source, such as a computer, a remote server, a storage network, another computing device 600, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 680 may also be provided to provide wireless data transfers between computing device 600 and external sources, such as computers, storage networks, headphones, microphones, cameras, or the like. As illustrated in FIG. 6, wireless protocols may include Wi-Fi (e.g. IEEE 802.11 a/b/g/n, WiMax), Bluetooth, IR and the like.

GPS receiving capability may also be included in various embodiments of the present invention, however is not required. As illustrated in FIG. 6, GPS functionality is included as part of wireless interface 180 merely for sake of convenience, although in implementation, such functionality is currently performed by circuitry that is distinct from the Wi-Fi circuitry and distinct from the Bluetooth circuitry.

Additional wireless communications may be provided via RF interfaces 690 and drivers 700 in various embodiments. In various embodiments, RF interfaces 690 may support any future-developed or conventional radio frequency communications protocol, such as CDMA-based protocols (e.g. WCDMA), GSM-based protocols, HSUPA-based protocols, or the like. In the embodiments illustrated, driver 700 is illustrated as being distinct from applications processor 610. However, in some embodiments, these functionality are provided upon a single IC package, for example the Marvel PXA330 processor, and the like. It is contemplated that some embodiments of computing device 600 need not include the RF functionality provided by RF interface 690 and driver 700.

FIG. 6 also illustrates computing device 600 to include physical sensors 710. In various embodiments of the present invention, physical sensors 710 can be single axis or multi-axis Micro-Electro-Mechanical Systems (MEMS) based devices being developed by M-cube, the assignee of the present patent application. Physical sensors 710 can include accelerometers, gyroscopes, pressure sensors, magnetic field sensors, bio sensors, and the like. In other embodiments of the present invention, conventional physical sensors 710 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 630 and driver 640 and inputs/or outputs to physical sensors 710 may be processed in parallel processing threads. In other embodiments, such events or outputs may be processed serially, or the like. Inputs and outputs from other functional blocks may also be processed in parallel or serially, in other embodiments of the present invention, such as image acquisition device 650 and physical sensors 710.

FIG. 6 is representative of one computing device 600 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 6. For example, in various embodiments, computing device 600 may lack image acquisition unit 650, or RF interface 690 and/or driver 700, or GPS capability, or the like. Additional functions may also be added to various embodiments of computing device 600, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Figure 7:
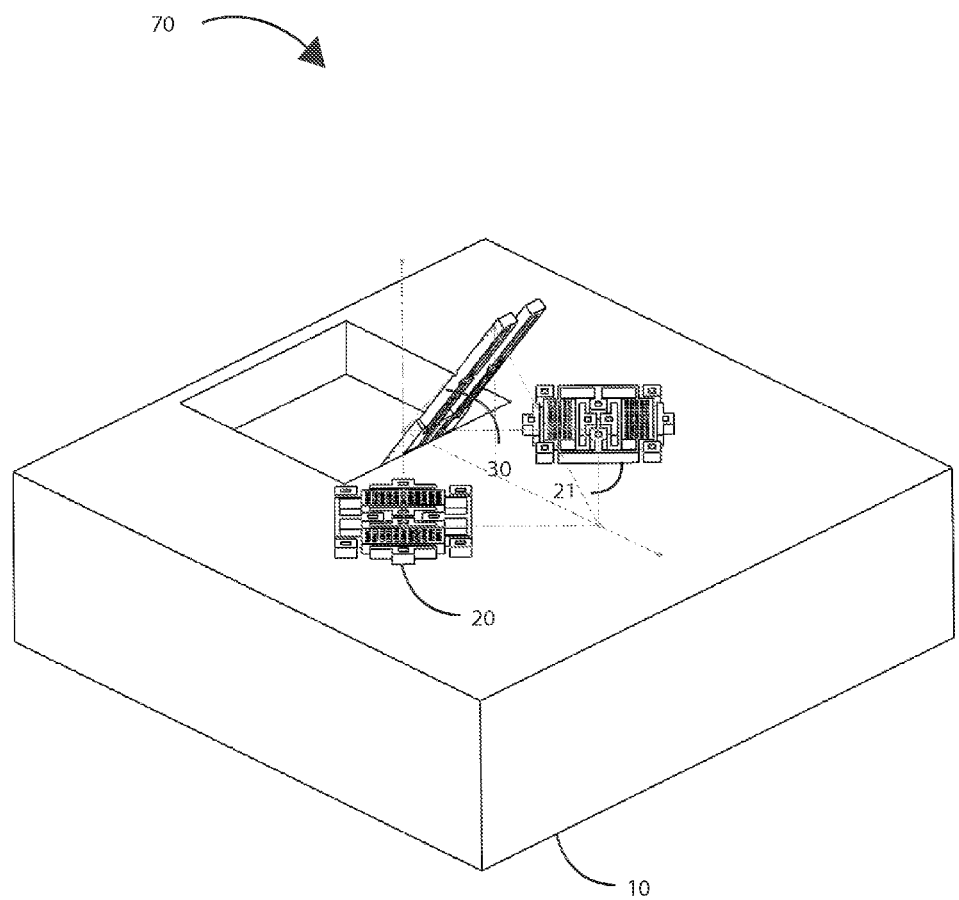
FIG. 7 is a simplified diagram illustrating a perspective view of a quartz and MEMS inertial sensing device according to an embodiment of the present invention.

FIG. 7 is a simplified diagram illustrating a perspective view of a quartz and MEMS inertial sensing device according to an embodiment of the present invention. This diagram is merely an example, which should not unduly limit the scope of the claims herein. One of ordinary skill in the art would recognize other variations, modifications, and alternatives. As shown, system 70 includes a substrate member 10, a first inertial sensing device 20, a second inertial sensing device 21, and a third inertial sensing device 30. Those of ordinary skill in the art will recognize other variations, modifications, and alternatives.

In a specific embodiment, the third inertial sensing device 30 can be operably coupled to both first sensing device 20 and the second sensing device 21. Both first inertial sensing device 20 and second inertial sensing device 21 can be integrated with substrate member 10. Also, third inertial sensing device 30 can be coupled to substrate member 10. In other embodiments, third inertial sensing device 30 can be coupled to only first sensing device 20 or second sensing device 21. In further embodiments, third inertial sensing device 30 can be configured independently of first sensing device 20 and second sensing device 21. In a specific embodiment, first inertial sensing device 20 and second inertial sensing device 21 can be configured on the same spatial plane, such as an X-Y plane or Y-Z plane, and oriented in a perpendicular pattern on the spatial plane. In other embodiments, first sensing device 20 and second sensing device 21 can be oriented in any other pattern on the same spatial plane. In further embodiments, first sensing device 20 and second sensing device 21 can be configured on separate spatial planes (i.e., X-Y, Y-Z, X-Z). In a specific embodiment, third inertial sensing device 30 can be spatially disposed between first sensing device 20 and second sensing device 21. In a specific embodiment, third inertial sensing device 30 can be configured to be spatially disposed between first sensing device 20 and second sensing device 21 at an angle of 54.7 degrees. In other specific embodiments, third inertial sensing device 30 can be configured at other angles. In a specific embodiment, one or more modules can be coupled to first sensing device 20, second sensing device 21, and third inertial sensing device 30. Of course, there can be other variations, modifications, and alternatives.

In a specific embodiment, first sensing device 20 can be configured to detect at least a first direction and second sensing device 21 can be configured to detect at least a second direction. Third inertial sensing device 30 can also be configured to detect at least a third direction. In other embodiments, each sensing device (20, 21, and 30) can be configured to detect one or more directions. In a specific embodiment, the one or more modules can be configured to calibrate at least first inertial sensing device 20 to third inertial sensing device 30. The one or more modules can also be configured to calibrate at least second sensing device 21 to third inertial sensing device 30. In other specific embodiments, the one or more modules can be configured to associate at least first sensing device 20 to third inertial sensing device 30. The one or more modules can also be configured to associate at least second sensing device 21 to third inertial sensing device 30. In various embodiments, the one or more modules can include one or more CMOS integrated circuits, which can be formed overlying the substrate member. The one or more CMOS integrated circuits can be used to configure first inertial sensing device 20 and second inertial sensing 21 devices to use third inertial sensing device 30 as a reference device. Those skilled in the art will recognize other variations, modifications, and alternatives.

In a specific embodiment, first sensing device 20 is a first MEMS gyroscope and second sensing device 21 is a second MEMS gyroscope device. In a specific embodiment, the first gyroscope and the second gyroscope can comprise at least a first material such as silicon (single crystalline, polycrystalline, amorphous, etc.), oxide, metal, or any other material and combinations thereof. Also, third inertial sensing device 30 can include a quartz substrate member, or a member comprising quartz, or other materials and combinations thereof. In a specific embodiment, substrate member 10 can include quartz, silicon, metal, or any other materials and combinations thereof. As said before, there can be other variations, modifications, and alternatives.

Many benefits are achieved by way of various embodiments of the present invention over conventional techniques. For example, the present technique provides an easy to use process that relies upon conventional technology. In some embodiments, the method provides higher device yields in dies per wafer with the integrated approach. Additionally, the method provides a process and system that are compatible with conventional process technology without substantial modifications to conventional equipment and processes. Preferably, the embodiments of the invention provide for an improved inertial sensing device with greater accuracy and reliability. The inherent stability of the quartz crystal makes it an ideal material as a sensor element. Quartz is resistant to temperature fluctuations, which makes it more resilient to degradation and better able to constant voltages in corresponding devices compared to other materials (such as ceramic materials). Compact quartz-based gyro-sensors, such as those created by Epson, can be manufactured to have great stability and environmental resistance with low power consumption. These sensors, and others, would be ideal to use as an accurate reference device. In various embodiments, MEMS devices would be able to achieve low production costs, making the integrated use of quartz and MEMS both cost-efficient and accurate. In one or more preferred embodiments, the present invention uses micro-machining techniques, such as those commonly used in the manufacture of MEMS and/or semiconductor devices. Depending upon the embodiment, one or more of these benefits may be achieved. These and other benefits will be described in more throughout the present specification and more particularly below.

Figure 8:
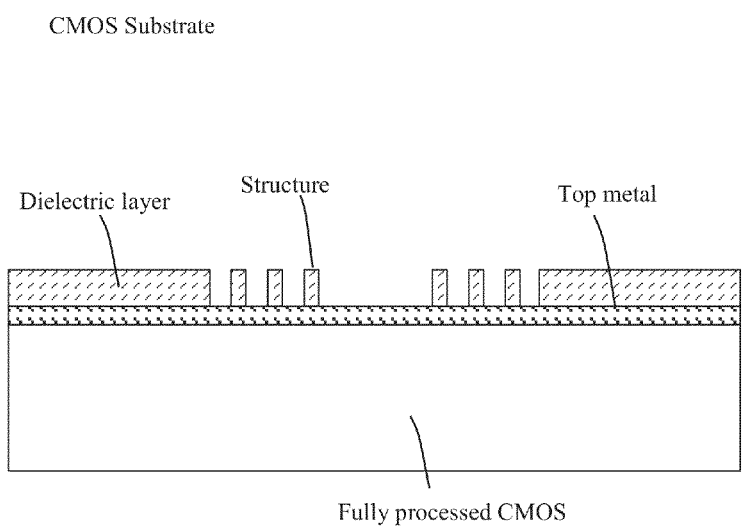
FIG. 8 is a simplified cross section diagram of components of a starting CMOS substrate according to one embodiment of the present invention.

FIG. 8 is a simplified cross section diagram of components of a starting CMOS substrate according to one embodiment of the present invention. As depicted, the starting substrate is a fully processed CMOS wafer. A dielectric layer such as oxide and nitride is deposited on top of a top metal layer of the CMOS wafer. The dielectric layer is then patterned to form a structure that provides anchor points for stationary members of the mechanical sensing device.

Figure 9:
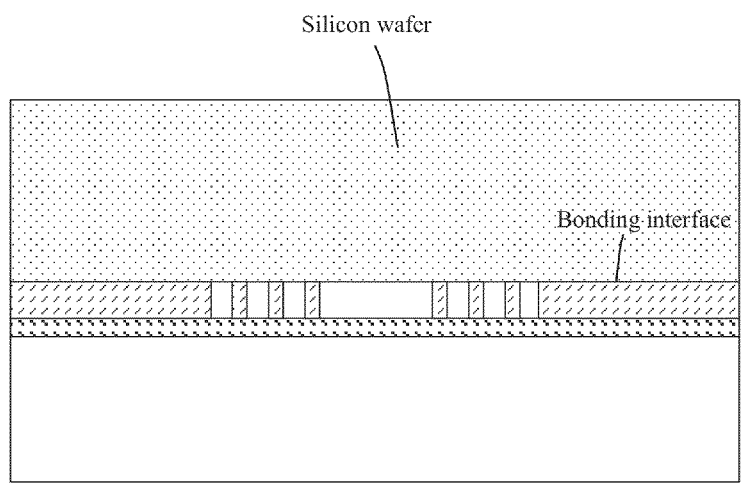
FIG. 9 is a simplified cross section diagram of components of a monolithically integrated inertial sensing device according to one embodiment of the present invention.

FIG. 9 is a simplified cross section diagram of components of a monolithically integrated inertial sensing device according to one embodiment of the present invention. As depicted, a silicon wafer is bonded to the CMOS substrate. The bonding methods include but not limited to: covalent, Sprin-on-glass (SOG), Eutectic, and anodic. The bonding temperature is CMOS compatible and below 400 C.

Figure 10:
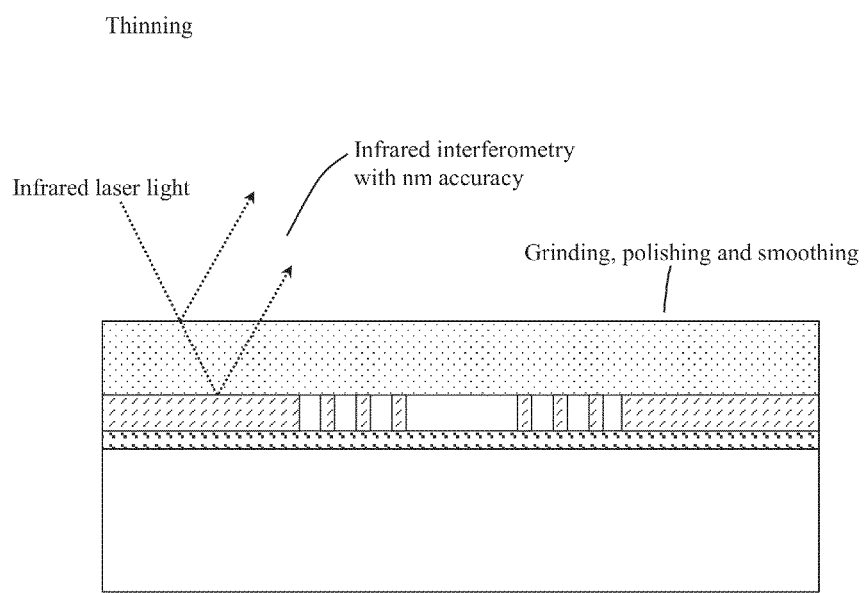
FIG. 10 is a simplified cross section diagram of components of a monolithically integrated inertial sensing device according to one embodiment of the present invention.

FIG. 10 is a simplified cross section diagram of components of a monolithically integrated inertial sensing device according to one embodiment of the present invention. As depicted, the silicon substrate is thinned by techniques such as grinding, polishing, and etching. The final thickness of the remaining silicon atop of the CMOS is precisely measured by infrared interferometry method with nano meter accuracy. Infrared wavelength is used because silicon is transparent in this spectrum.

Figure 11:
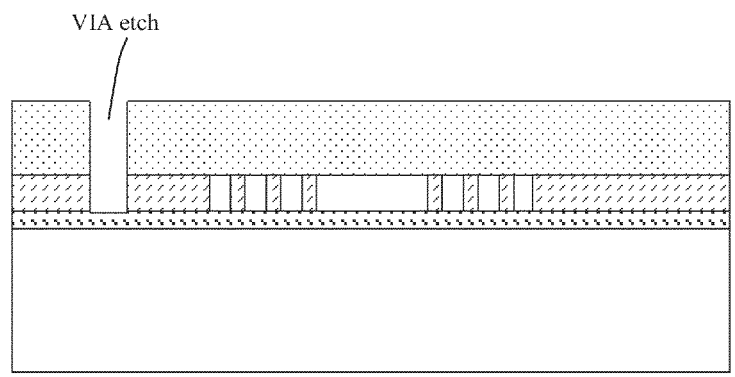
FIG. 11 is a simplified cross section diagram of components of a monolithically integrated inertial sensing device according to one embodiment of the present invention.

FIG. 11 is a simplified cross section diagram of components of a monolithically integrated inertial sensing device according to one embodiment of the present invention. As depicted, a VIA hole is etched into the silicon and top dielectric layers and stop on the top metal layer. The size of the VIA ranges from 0.5 um to a few micro meters depending on the thickness of the silicon layer. The profile or sidewall of the VIA is tapered or slopped for better step coverage of subsequent metalization step.

Figure 12:
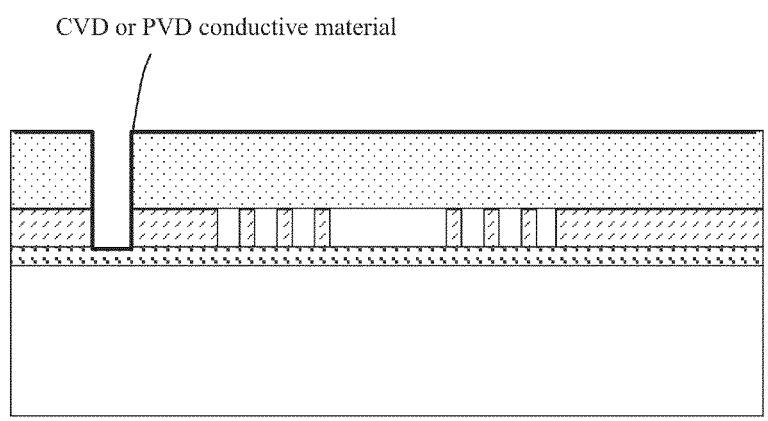
FIG. 12 is a simplified cross section diagram of components of a monolithically integrated inertial sensing device according to one embodiment of the present invention.

FIG. 12 is a simplified cross section diagram of components of a monolithically integrated inertial sensing device according to one embodiment of the present invention. As depicted, a metal layer is blanket deposited on the wafer covering the silicon surface as well as the VIA surface. CVD or PVD recipes are optimized to achieve good step coverage of the VIA as well as low stress of the metal film. In one embodiment, the metal layer is a CVD TiN material that has excellent step coverage of the VIA. The thickness of the metal ranges from a few hundreds of angstroms to a few micro meters depending the applications requirements. An optional electroplating step can be used to fill the entire VIA with metals such as Copper or Nickel.

Figure 13:
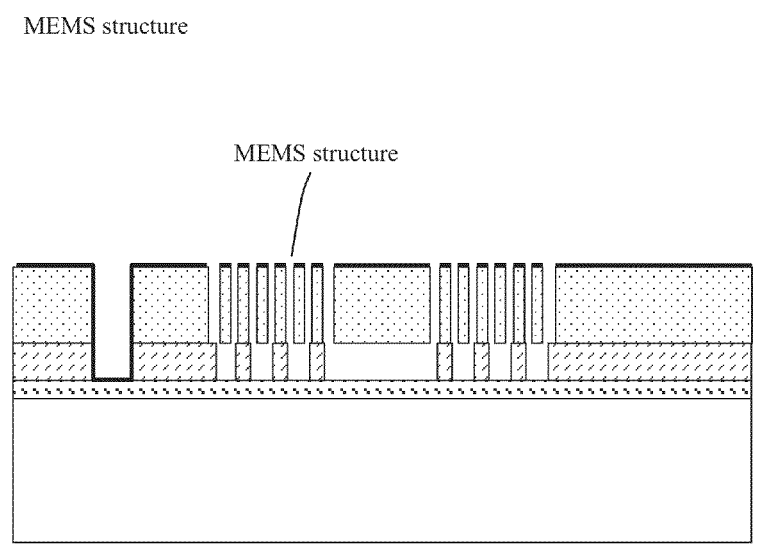
FIG. 13 is a simplified cross section diagram of components of a monolithically integrated inertial sensing device according to one embodiment of the present invention.

FIG. 13 is a simplified cross section diagram of components of a monolithically integrated inertial sensing device according to one embodiment of the present invention. As depicted, the silicon layer is patterned typically by a DRIE step. For a capacitive inertial sensor, the mechanical structure includes a proof mass connected with springs, movable comb fingers and stationary comb fingers that anchored to the top oxide. The springs have desired stiffness/compliance that allows the proof mass to move at certain external acceleration. The comb fingers moving along with the proof mass couples to stationary comb fingers capacitively. The movement causes a change in capacitance between the movable comb fingers and stationary comb fingers. The capacitance change is detected by the integrated circuits a few micrometer below.

Figure 14:
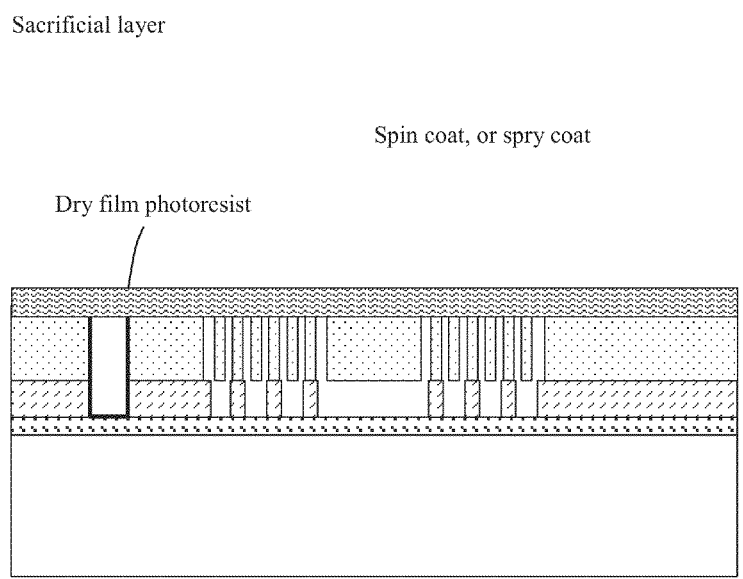
FIG. 14 is a simplified cross section diagram of components of a monolithically integrated inertial sensing device according to one embodiment of the present invention.

FIG. 14 is a simplified cross section diagram of components of a monolithically integrated inertial sensing device according to one embodiment of the present invention. As depicted, an organic sacrificial material is deposited covering the mechanical structure. In one embodiment, the sacrificial material is a liquid photo resist that is spin coated on the wafer and fill all the VIA holes and trenches. In another embodiment, the sacrificial material is a dry film photoresist that is deposited on the surface of the wafer and does not fill the holes and trenches.

Figure 15:
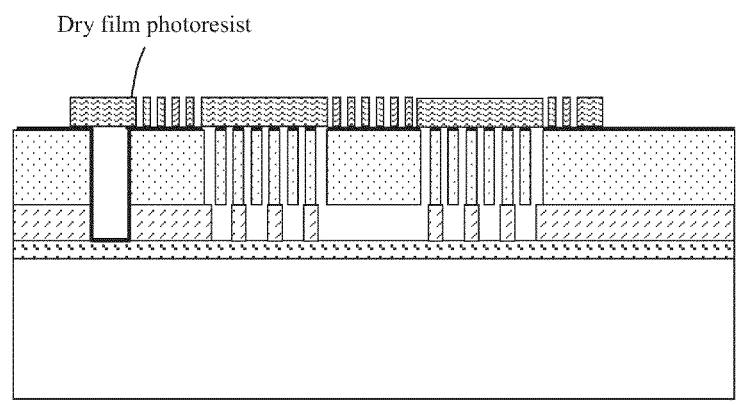
FIG. 15 is a simplified cross section diagram of components of a monolithically integrated inertial sensing device according to one embodiment of the present invention.

FIG. 15 is a simplified cross section diagram of components of a monolithically integrated inertial sensing device according to one embodiment of the present invention. As depicted, the photo resist is patterned by an exposure and develop lithography process. The exposed areas are non-trench features such as proof mass and anchors.

Figure 16:
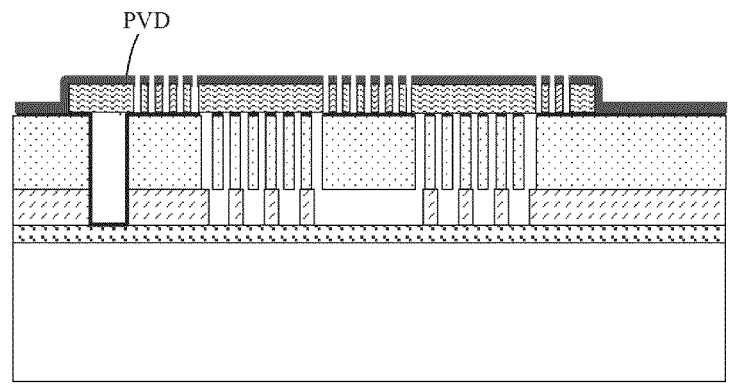
FIG. 16 is a simplified cross section diagram of components of a monolithically integrated inertial sensing device according to one embodiment of the present invention.

FIG. 16 is a simplified cross section diagram of components of a monolithically integrated inertial sensing device according to one embodiment of the present invention. As depicted, the $1^{st}$ layer of the encapsulation is deposited by a PVD process. The deposition recipe is optimized for non-conforming purpose, which has little step coverage of the sidewall of the exposed photoresist trenches.

Figure 17:
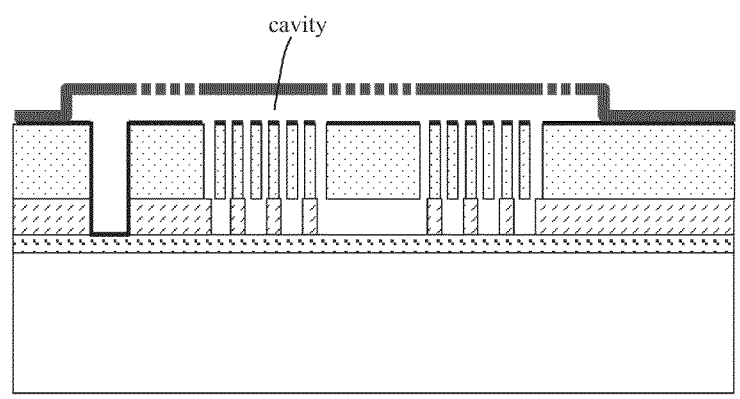
FIG. 17 is a simplified cross section diagram of components of a monolithically integrated inertial sensing device according to one embodiment of the present invention.

FIG. 17 is a simplified cross section diagram of components of a monolithically integrated inertial sensing device according to one embodiment of the present invention. As depicted, the sacrificial organic material is then removed by a dry O2 plasma ashing step. The removal of the sacrificial material releases the sensor device and forms the $1^{st}$ shell of the encapsulation.

Figure 18:
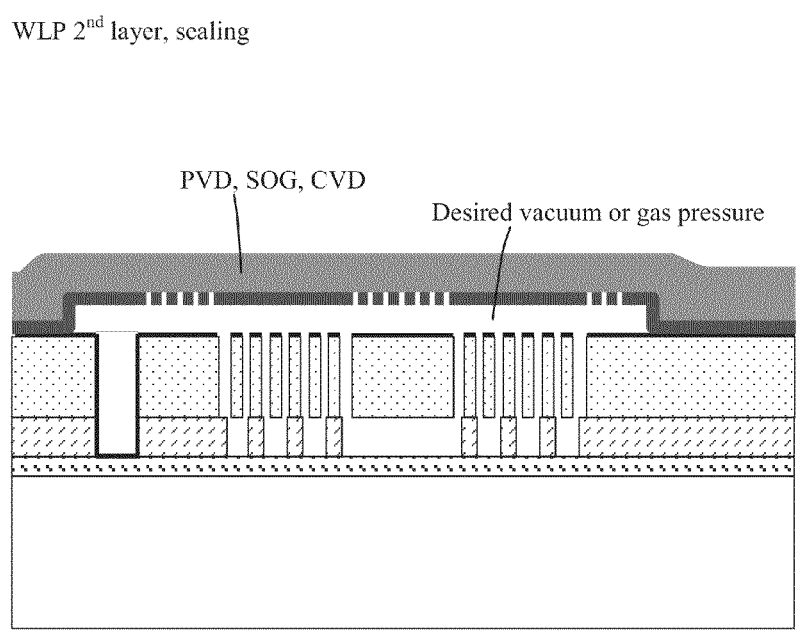
FIG. 18 is a simplified cross section diagram of components of a monolithically integrated inertial sensing device according to one embodiment of the present invention.

FIG. 18 is a simplified cross section diagram of components of a monolithically integrated inertial sensing device according to one embodiment of the present invention. As depicted, the $2^{nd}$ layer of the encapsulation is deposited onto the $1^{st}$ layer. The sealing methods include PVD, spin-on, or spray-on techniques. The sealing materials include metal such as Ti, TiN, amorphous silicon, spin-on-glass, spray-on-glass, or a combination of the above. The ambient during sealing is optimized and controlled to a desired spec that defines the sensor device ambient after sealing. A getter material such as Ti can be deposited as the $1^{st}$ layer of the encapsulation and activated later to achieve high vacuum and cleanness of the sensor ambient environment. After sealing the holes, an optional CVD dielectric material such as oxide or nitride can be added onto the encapsulation.

Figure 19:
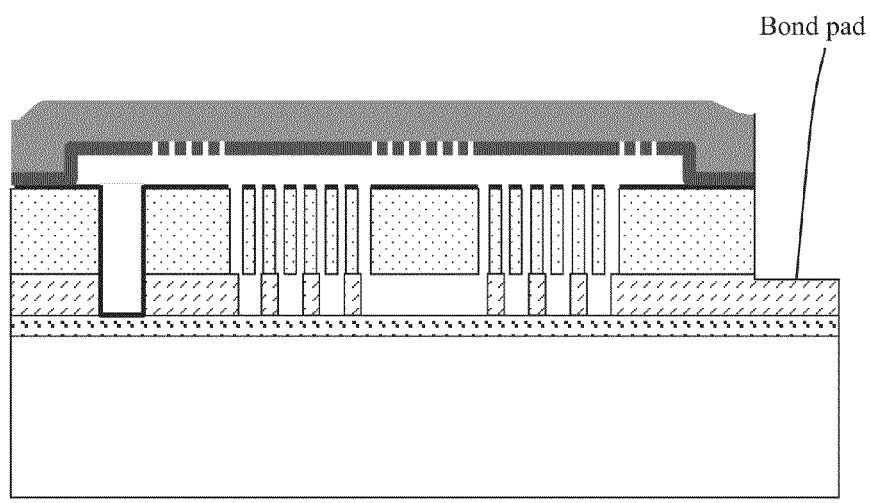
FIG. 19 is a simplified cross section diagram of components of a monolithically integrated inertial sensing device according to one embodiment of the present invention.

FIG. 19 is a simplified cross section diagram of components of a monolithically integrated inertial sensing device according to one embodiment of the present invention. As shown, a bond pad structure is formed. The bond pad structure can be formed by pattern and etch techniques known in the art, but can also be others depending on the application.

Comparing to the incumbent bulk or surface micromachined MEMS inertial sensors, the vertically monolithically integrated inertial sensors have smaller chip size, lower parasitics, higher sensitivity, lower power, and lower cost. Using this architecture and fabrication flow, it is also feasible and cost-effective to make an array of inertial sensors for sensing multiple axes of accelerations on a single chip.

These diagrams are merely examples, which should not unduly limit the scope of the claims herein. In light of the present invention disclosure, one of ordinary skill in the art would recognize many other variations, modifications, and alternatives. For example, various steps outlined above may be added, removed, modified, rearranged, repeated, and/or overlapped, as contemplated within the scope of the invention. It is also understood that the examples and embodiments described herein are for illustrative purposes only and that various modifications or changes in light thereof will be suggested to persons skilled in the art and are to be included within the spirit and purview of this process and scope of the appended claims.

What is claimed is:

1. A handheld device comprising:
a housing;
a display;
a monolithically integrated MEMS-CMOS (Micro Electro Mechanical System-Complementary Metal Oxide Semiconductor) inertial sensor disposed within the housing, wherein the MEMS-CMOS inertial sensor is configured to sense a change in spatial orientation when a user reorients the handheld device, wherein the monolithically integrated MEMS-CMOS inertial sensor comprises:
a first semiconductor substrate having a first surface region;
one or more CMOS integrated circuit devices provided on a CMOS integrated circuit device region overlying the first surface region, the CMOs integrated circuit device region having a CMOS surface region;
a dielectric region overlying the CMOS surface region, the dielectric region having a cavity region provided therein;
a second semiconductor substrate having a second surface region overlying the dielectric region and enclosing the cavity region, the second semiconductor substrate having a spring region overlying a vicinity of the cavity region;
a first piezo resistor device provided within a first portion of the spring region of the second semiconductor substrate;
a second piezo resistor device provided within a second portion of the spring region of the second semiconductor substrate; and
a mass of material coupled to a portion of the spring region of the second semiconductor substrate between the second piezo resistor device and the first piezo resistor device, the mass material being overlying the cavity region and coupled to the spring region to be movable from at least a first position to a second position and to be sensed respectively by either or both the first piezo resistor device and the second piezo resistor device; and
a processor disposed within the housing and coupled to the MEMS-CMOS inertial sensor and to the display,
wherein the processor is programmed to receive the change in spatial orientation of the handheld device,
wherein the processor is programmed to output an indication of the change in spatial orientation on the display,
wherein the processor is programmed to implement a hysteresis adjustment for outputting indications of the spatial orientation of the handheld device,
wherein a threshold for the change of spatial orientation from at least a first orientation to at least a second orientation is associated with a first threshold and a first indication outputted to the display, and
wherein the threshold for the change of spatial orientation from at least the second orientation to at least the first orientation is associated with a second threshold and a second indication outputted to the display, wherein a range between the first and second threshold configured as an "unknown" region that will not generate an output.

2. The handheld device of claim 1 wherein the monolithically integrated MEMS-CMOS inertial sensor comprises a MEMS inertial sensor manufactured using a foundry compatible process.

3. The handheld device of claim 1 wherein the monolithically integrated MEMS-CMOS inertial sensor comprises a three-axis inertial sensor, wherein the three-axis inertial sensing device comprises:
a substrate member;
a first inertial sensing device comprising at least a first material and configured to detect at least a first direction, the first inertial sensing device being integrated with the substrate member;
a second inertial sensing device comprising at least the first material and configured to detect at least a second direction, the second inertial sensing device being integrated with the substrate member; and
a third inertial sensing device comprising at least a quartz material and configured to detect at least a third direction, wherein the third inertial sensing device is spatially disposed between the first inertial sensing device and the second inertial sensing device at an angle of 54.7 degrees.

4. The handheld device of claim 3 wherein the monolithically integrated MEMS-CMOS inertial sensor is configured to sense a change in spatial orientation in three-dimensions when the user spatially reorients the handheld device.

5. The handheld device of claim 4 wherein the processor is programmed to determine the spatial orientation of the handheld device in three-dimensions.

6. The handheld device of claim 1 wherein the first indication outputted to the display is associated with a landscape display mode and the second indication outputted to the display is associated with a portrait display mode.

7. The handheld device of claim 1
wherein the threshold for the change of spatial orientation from the second orientation to a third orientation is associated with a third threshold and a third indication outputted to the display;
wherein the threshold for the change of spatial orientation from the third orientation to the second orientation is associated with a fourth threshold and the first indication outputted to the display;
wherein the threshold for the change of spatial orientation from the third orientation to a fourth orientation is associated with a fifth threshold and a fourth indication outputted to the display;
wherein the threshold for the change of spatial orientation from the fourth orientation to the third orientation is associated with a sixth threshold and the third indication outputted to the display;
wherein the threshold for the change of spatial orientation from the fourth orientation to the first orientation is associated with a seventh threshold and the second indication outputted to the display; and
wherein the threshold for the change of spatial orientation from the first orientation to the fourth orientation is associated with an eighth threshold and the fourth indication outputted to the display.

8. The handheld device of claim 7 wherein the first and fourth indications outputted to the display are associated with a landscape display mode and the second and third indications outputted to the display are associated with a portrait display mode.

9. The handheld device of claim 7 wherein the first indication outputted to the display is associated with a first landscape display mode, the second indication outputted to the display is associated with a first portrait display mode, the third indication outputted to the display is associated with a second portrait display mode, and the fourth indication outputted to the display is associated with a second landscape display mode.

10. The handheld device of claim 7 wherein the thresholds comprise specific angles with respect to planes in three-dimensions.

11. A method for a handheld computer system for determining spatial orientation comprising:
 sensing, in a monolithically integrated MEMS-CMOS (Micro Electro Mechanical System-Complementary Metal Oxide Semiconductor) inertial sensor disposed within the handheld computer system, a change in spatial orientation in response to a user spatially reorienting the handheld device;
 wherein the monolithically integrated MEMS-CMOS inertial sensor comprises:
  a first semiconductor substrate having a first surface region;
  one or more CMOS integrated circuit devices provided on a CMOS integrated circuit device region overlying the first surface region, the CMOs integrated circuit device region having a CMOS surface region;
  a dielectric region overlying the CMOS surface region, the dielectric region having a cavity region provided therein;
  a second semiconductor substrate having a second surface region overlying the dielectric region and enclosing the cavity region, the second semiconductor substrate having a spring region overlying a vicinity of the cavity region;
  a first piezo resistor device provided within a first portion of the spring region of the second semiconductor substrate;
  a second piezo resistor device provided within a second portion of the spring region of the second semiconductor substrate; and
  a mass of material coupled to a portion of the spring region of the second semiconductor substrate between the second piezo resistor device and the first piezo resistor device, the mass material being overlying the cavity region and coupled to the spring region to be movable from at least a first position to a second position and to be sensed respectively by either or both the first piezo resistor device and the second piezo resistor device;
 determining, in a processor, the spatial orientation of the handheld device, wherein the determining comprises determining in the processor, programmed to implement a hysteresis adjustment for the displaying of indications, the spatial orientation of the handheld computer system, wherein a threshold for the change of spatial orientation from at least a first orientation to at least a second orientation is associated with a first threshold and a first indication outputted to the display, and wherein the threshold for the change of spatial orientation from at least the second orientation to at least the first orientation is associated with a second threshold and a second indication outputted to the display, wherein a range between the first and second threshold configured as an "unknown" region that will not generate an output; and displaying, on a display, an indication of the spatial orientation of the handheld device.

12. The method of claim 11 wherein the sensing comprises sensing, in a MEMS inertial sensor manufactured using a foundry compatible process, the changes in spatial orientation of the handheld computer system.

13. The method of claim 11 wherein the sensing comprises sensing, in a three-axis MEMS inertial sensor, the changes in spatial orientation of the handheld computer system; wherein the three-axis inertial sensing device comprises:
 a substrate member;
 a first inertial sensing device comprising at least a first material and configured to detect at least a first direction, the first inertial sensing device being integrated with the substrate member;
 a second inertial sensing device comprising at least the first material and configured to detect at least a second direction, the second inertial sensing device being integrated with the substrate member; and
 a third inertial sensing device comprising at least a quartz material and configured to detect at least a third direction, wherein the third inertial sensing device is spatially disposed between the first inertial sensing device and the second inertial sensing device at an angle of 54.7 degrees.

14. The method of claim 13 wherein the user spatially reorients the handheld device in three-dimensions.

15. The method of claim 14 wherein the determining comprises determining, in the processor, the spatial orientation of the handheld device in three-dimensions.

16. The method of claim 11 wherein the first indication outputted to the display is associated with a landscape display mode and the second indication outputted to the display is associated with a portrait display mode.

17. The method of claim 11
 wherein the determining comprises determining in the processor, programmed to implement a hysteresis adjustment for the output of indications, the spatial orientation of the handheld computer system;
 wherein the threshold for the change of spatial orientation from a first orientation to a second orientation is associated with a first threshold and a first indication outputted to the display;
 wherein the threshold for the change of spatial orientation from the second orientation to the first orientation is associated with a second threshold and a second indication outputted to the display;
 wherein the threshold for the change of spatial orientation from the second orientation to a third orientation is associated with a third threshold and a third indication outputted to the display;
 wherein the threshold for the change of spatial orientation from the third orientation to the second orientation is associated with a fourth threshold and the first indication outputted to the display;
 wherein the threshold for the change of spatial orientation from the third orientation to a fourth orientation is associated with a fifth threshold and a fourth indication outputted to the display;
 wherein the threshold for the change of spatial orientation from the fourth orientation to the third orientation is associated with a sixth threshold and the third indication outputted to the display;
 wherein the threshold for the change of spatial orientation from the fourth orientation to the first orientation is associated with a seventh threshold and the second indication outputted to the display; and wherein the threshold for the change of spatial orientation from the first orientation to the fourth orientation is associated with an eighth threshold and the fourth indication outputted to the display.

18. The method of claim 17 wherein the first and fourth indications outputted to the display are associated with a landscape display mode and the second and third indications outputted to the display are associated with a portrait display mode.

19. The method of claim 17 wherein the first indication outputted to the display is associated with a first landscape display mode, the second indication outputted to the display is associated with a first portrait display mode, the third indication outputted to the display is associated with a second portrait display mode, and the fourth indication outputted to the display is associated with a second landscape display mode.

20. The method of claim 17 wherein the thresholds comprise specific angles with respect to planes in three-dimensions.

* * * * *